US009207096B2

(12) United States Patent
Sartipi et al.

(10) Patent No.: US 9,207,096 B2
(45) Date of Patent: Dec. 8, 2015

(54) MAP MAGNIFIER

(75) Inventors: Siamak Sartipi, Waterloo (CA); Jason Christopher Beckett, St Catharines (CA)

(73) Assignee: BlackBerry Limited, Waterloo (CA)

( * ) Notice: Subject to any disclaimer, the term of this patent is extended or adjusted under 35 U.S.C. 154(b) by 194 days.

(21) Appl. No.: 13/156,926

(22) Filed: Jun. 9, 2011

(65) Prior Publication Data

US 2012/0316782 A1 Dec. 13, 2012

(51) Int. Cl.
*G01C 21/36* (2006.01)
*G09B 29/10* (2006.01)

(52) U.S. Cl.
CPC ............ *G01C 21/367* (2013.01); *G09B 29/106* (2013.01); *G06K 2215/0057* (2013.01); *G06T 2207/20101* (2013.01)

(58) Field of Classification Search
CPC ............ G06T 2207/20101; G06K 2215/0057; G01C 21/367; G09B 29/106
USPC ......... 701/409, 454, 522, 523, 532, 537, 538; 707/802; 715/781, 854, 855, 234; 345/156, 173, 204, 660, 661; 382/232, 382/256
See application file for complete search history.

(56) References Cited

U.S. PATENT DOCUMENTS

| | | | | |
|---|---|---|---|---|
| 5,638,523 A * | 6/1997 | Mullet et al. | ................... | 715/855 |
| 6,321,158 B1 * | 11/2001 | DeLorme et al. | ............. | 701/426 |
| 6,430,411 B1 * | 8/2002 | Lempio et al. | ............. | 455/432.1 |
| 6,898,523 B2 * | 5/2005 | Cochlovius et al. | .......... | 701/455 |
| 7,158,878 B2 * | 1/2007 | Rasmussen et al. | .......... | 701/532 |
| 7,437,670 B2 * | 10/2008 | Day et al. | ...................... | 715/273 |
| 7,555,725 B2 * | 6/2009 | Abramson et al. | ............ | 701/532 |
| 7,904,483 B2 * | 3/2011 | Koch et al. | ..................... | 707/802 |
| 2002/0143826 A1 * | 10/2002 | Day et al. | ...................... | 707/526 |
| 2002/0163547 A1 | 11/2002 | Abramson et al. | | |
| 2006/0077055 A1 * | 4/2006 | Basir | ........................ | 340/539.13 |
| 2007/0078599 A1 * | 4/2007 | Yoshioka et al. | ............. | 701/211 |
| 2008/0040684 A1 | 2/2008 | Crump | | |
| 2009/0058685 A1 * | 3/2009 | McCall et al. | ........... | 340/995.24 |

(Continued)

FOREIGN PATENT DOCUMENTS

| | | |
|---|---|---|
| DE | 102008053547 A1 | 4/2010 |
| EP | 1930696 A2 | 6/2008 |
| JP | 054196 A | 3/2010 |

OTHER PUBLICATIONS

Extended European Search Report from EPO from corresponding EP application 11169325.5 Dated Nov. 3, 2011.
Canadian Intellectual Property Office, Office Action, Application No. 2779590, Mar. 27, 2015.

(Continued)

*Primary Examiner* — Yonel Beaulieu
*Assistant Examiner* — Dale W Hilgendorf
(74) *Attorney, Agent, or Firm* — Moffat & Co.

(57) ABSTRACT

A method of magnifying a portion of a map displayed on a computing device includes displaying the map at a first zoom level and displaying a magnified portion of the map at a second zoom level. The magnified portion comprises an interactive map element. The magnified portion acts as a localized map magnifier. The magnified portion may be round to resemble a virtual magnifying glass. In certain implementations, multiple map magnifiers may be displayed simultaneously. Map magnifiers may be displayed, for example, at waypoints along a route, at map markers corresponding to points of interest or at the locations associated with search results.

20 Claims, 34 Drawing Sheets

(56) References Cited

U.S. PATENT DOCUMENTS

| | | | |
|---|---|---|---|
| 2009/0182501 A1* | 7/2009 | Fyke et al. | 701/208 |
| 2009/0198767 A1* | 8/2009 | Jakobson et al. | 709/203 |
| 2010/0088631 A1* | 4/2010 | Schiller | 715/784 |
| 2010/0220174 A1 | 9/2010 | Mendoza et al. | |
| 2010/0299630 A1 | 11/2010 | McCutchen et al. | |
| 2011/0304750 A1* | 12/2011 | Lee et al. | 348/240.99 |

OTHER PUBLICATIONS www.dynamicwp.net/plugins/image-zoomer-plugin/ Mar. 16, 2010.
www.usflashmap.com/component/mega_zoom.htm.
www.magictoolbox.com/magicmagnifyplus/examples.
Macromedia Flash 8—Ireland May, on mouseover Dublin- forum discussion.

\* cited by examiner

MAP MAGNIFIER

CROSS-REFERENCE TO RELATED APPLICATIONS

This is the first application filed for the present technology.

TECHNICAL FIELD

The present technology relates generally to digital maps and, in particular, to techniques for zooming or magnifying digital maps.

BACKGROUND

Digital mapping is a technique whereby map data is compiled and rendered to form a virtual image of a map for display on a screen of a computer, mobile device, GPS navigation unit or the like. Map applications typically enable searching for addresses, points of interest, commercial establishments, or other labeled features. Map applications typically also enable panning and zooming.

When a user wishes to view in greater detail an onscreen map location associated with a search result, a specific map feature, a point of interest, an intersection or any other portion of the map, the user must magnify the map. There is typically a lag as additional map data is downloaded and rendered. This lag is most noticeable on mobile devices because the device must request and receive the additional map data over the air. Even when the additional map data is already cached on the device, there is some lag due to the time required to render the new map.

In addition to the lag, there is a loss of general context associated with magnification. In other words, by zooming in on the feature, the user loses the overview of the map area. The user thus typically spends an undesirable amount of time zooming in on a feature and then zooming out to regain a sense of context and overview. For example, this is a common scenario that arises when a user performs a local search for a particular point of interest (for which the results are mapped) and then wishes to examine each point of interest one by one. The conventional approach is for the user to zoom in on a POI, zoom out, then pan to the next POI where the zoom-in zoom-out cycle is repeated. This is inconvenient.

Some rudimentary solutions to this problem involve magnifying only a portion of the map using a virtual magnifying glass. This approach permits the user to view details of the magnified portion at an elevated zoom level while still viewing the rest of the map at its original zoom level. The functionality of these map magnifiers, however, is very limited. Accordingly, improvements on these map magnifier technologies remain highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
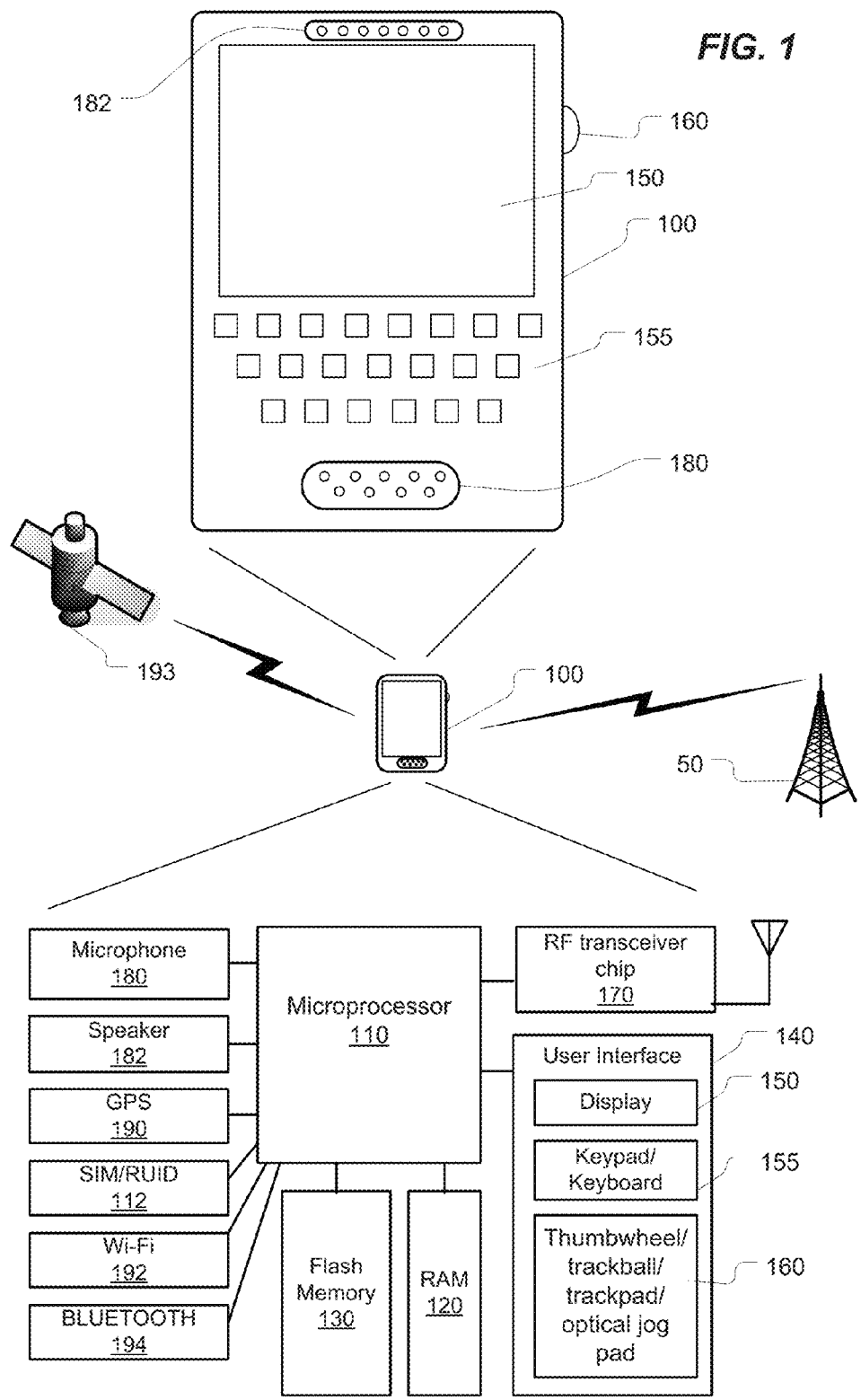
FIG. 1 is a schematic depiction of a wireless communications device as one example of a computing device on which the present technology can be implemented.

The present specification discloses a novel user-interactive map magnifier. The map magnifier includes at least one interactive map element. The interactive map element may be an onscreen map feature like a map marker, label, icon or the like that is adapted to present further information or otherwise react in response to the receipt of user input. The user input may be any of known type such as, for example, a mouse click on the interactive map element, hovering of the cursor over the interactive map element, touching the interactive map element where the map is displayed on a touchscreen device, etc. The interactive map element is thus an actionable visual element which can receive user input while magnified while being displayed in the map magnifier (i.e. while displayed within the magnified portion of the map).

The map magnifier is thus a magnified portion of a map that is displayed at a higher zoom level than that of the underlying map. The map magnifier thus enables map details to be viewed for a specific area of the map without having to zoom the entire map. In other words, the map magnifier is an area or portion of the map that appears on or over the map at a higher zoom level relative to the zoom level of the underlying map view. For ease of recognition, the map magnifier may be graphically presented onscreen as a circular area with a surrounding circular frame that resembles a virtual magnifying glass.

As will be elaborated below, this novel technology enables the user of a map to focus on map details for a localized area of interest without losing the overview or general context (i.e. without losing the "big picture"). The user of this novel feature can thus quickly and easily obtain a high level of detail (e.g. street names, labels, POI's, etc.) that are normally only available or legible at high zoom levels without having to manually zoom in on the feature. As will be elaborated below, this technology may be used to enhance many map functionalities such as local search, navigation and obtaining directions. A search engine employing such a feature would be able to display POI's or map markers for all search results on a single map while also presenting enough contextual detail or information about each POI or marker to enable the user to decide whether to touch, click or hover over the POI or marker to obtain further information from the POI or marker. Such a feature would thus potentially increase click-through rates for the search engine by increasing traffic to the POI's. Other advantages and features of this novel technology will be described below.

Accordingly, an aspect of the present technology is a method of magnifying a portion of a map displayed on a computing device. The method entails displaying the map at a first zoom level, displaying a magnified portion of the map at a second zoom level, and wherein the magnified portion comprises an interactive map element.

Another aspect of the present technology is a computer-readable medium upon which are stored instructions in code that are configured to perform the steps, acts or operations of the foregoing method when the computer-readable medium is loaded into memory and executed on a processor of a computing device.

Another aspect of the present technology is a computing device for displaying a map and for simultaneously displaying a magnified portion of the map. The computing device includes a processor operatively connected to a memory for executing a map application and a display for displaying the map and for simultaneously displaying the magnified portion of the map as an overlay on the map, wherein the magnified portion comprises an interactive map element.

The details and particulars of these aspects of the technology will now be described below, by way of example, with reference to the attached drawings.

Although the present technology may be implemented on any computing device, e.g. a desktop computer, laptop, tablet, handheld PDA, or mobile device, it is most useful in the context of a mobile device because of its small display screen and because of the pronounced effect of zoom lag.

FIG. 1 is a schematic depiction of a mobile device as one example of a computing device 100 on which the present technology can be implemented. It should be expressly understood that this figure is intentionally simplified to show only certain main components. The mobile device 100 may include other components beyond what is illustrated in FIG. 1.

As depicted in FIG. 1, the mobile device 100 includes a microprocessor 110 (or simply a "processor") which interacts with memory in the form of random access memory (RAM) 120 and flash memory 130. The mobile device includes one or more input/output devices or user interfaces 140, such as a display screen 150 (e.g. a small LCD screen or touch-sensitive display screen), and a keyboard or keypad 155. The user interface may also include a thumbwheel, trackball, trackpad or optical jog pad 160. The device may also include a USB port or serial port for connecting to peripheral equipment.

Where the mobile device is a wireless communications device, the device further includes a radiofrequency (RF) transceiver 170 for communicating wirelessly with one or more base stations 50. The mobile device may include a Subscriber Identity Module (SIM) card 112 for GSM-type devices or a Re-Usable Identification Module (RUIM) card for CDMA-type devices.

For telephony, the mobile device may include a microphone 180 and a speaker 182 (and optionally an earphone jack).

The mobile device 100 may also include a positioning system such as a Global Positioning System (GPS) receiver (chipset) 190 for receiving GPS radio signals transmitted from one or more orbiting GPS satellites 193.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

The mobile device 100 may optionally include a Bluetooth® transceiver 194, a near-field communications (NFC) chip and/or a Wi-Fi™ transceiver 192.

Position data for the current location may be obtained by a positioning system such as an onboard GPS chipset. Although GPS represents the best mode of implementing this technology presently known to the applicant(s), the mobile device could determine its location using another technique such as triangulation of signals from in-range base towers, such as used for Wireless E911. As is known in the art, Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ positioning system (WPS) may also be used.

The mobile device or other computing device can be configured to display a map and to simultaneously display a magnified portion of the map, in accordance with implementations of the present technology. To implement this technology, the computing device has its processor operatively connected to its memory for executing a map application. The processor also interacts with the device's display for displaying the map and for simultaneously displaying the magnified portion of the map as an overlay on the map. The magnified portion ("map magnifier") includes an interactive map element. A user of the device can thus touch, click or otherwise interact with the interactive map element as will be elaborated below.

Figure 2:
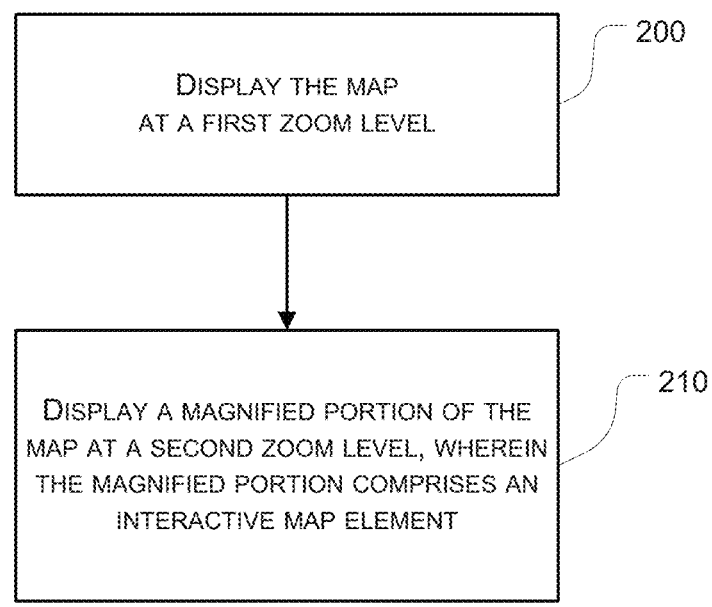
FIG. 2 is a flowchart outlining steps of a method of magnifying a portion of a map in accordance with implementations of the present technology.

FIG. 2 depicts a flowchart of a method of magnifying a portion of a map displayed on a computing device. This method entails a step, act or operation (200 of displaying the map at a first zoom level and a further step, act or operation (210) of displaying a magnified portion of the map at a second zoom level, wherein the magnified portion comprises an interactive map element. More than one interactive map element may be displayed within the magnified portion that forms the map magnifier.

The interactive map element may be an interactive map marker, icon, label, or other feature. The map element is said to be interactive because the user may touch, click, hover or otherwise interact with the map element. As such, all map elements are interactive or actionable regardless whether they are displayed within the magnified portion, zone or area or on the rest of the underlying map. This magnified portion, zone or area that forms the map magnifier may be implemented as a separate map layer that is overlaid on the underlying map. In most implementations, the map magnifier obscures the underlying portion of the map beneath the map magnifier. The map magnifier may be movable onscreen by clicking and dragging the map magnifier or (for a touch screen) touching and dragging the map magnifier. This permits the map magnifier to be moved by the user to any place on the map.

Various applications of this technology are now described by way of example only to further illustrate the advantages and features of this technology.

Figure 3:
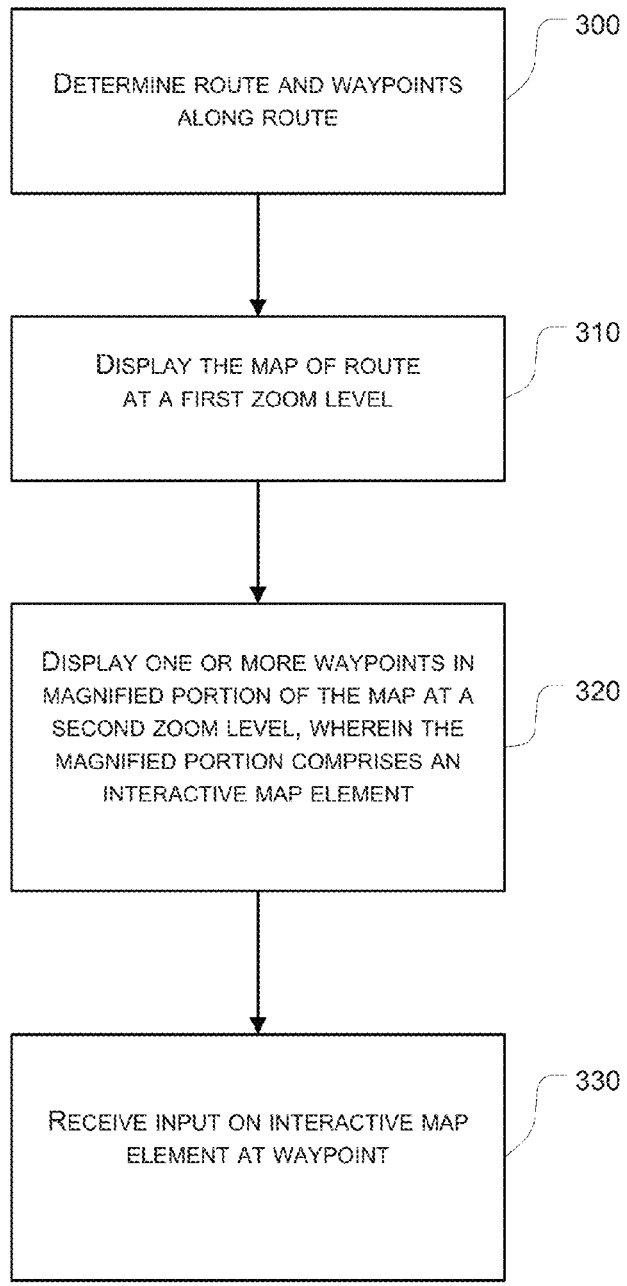
FIG. 3 is a flowchart outlining steps of a related method of magnifying one or more waypoints along a route in accordance with implementations of the present technology.

One application of this technology is magnifying waypoints or intersections along a route. FIG. 3 is a flowchart outlining steps of a method of magnifying one or more waypoints along a route. This method entails determining (300) a route and waypoints along the route, displaying (310) the map of the route at a first zoom level, displaying (320) one or more waypoints in one or more magnified portions of the map at a second zoom level. Each magnified portions include at least one interactive map element. The method then includes receiving (330) input on an interactive map element at the waypoint. Automatically magnifying all or a subset of the waypoints (or decision points) along a route may be done by successively magnifying the waypoints or by simultaneously magnifying all the waypoints.

Figure 4:
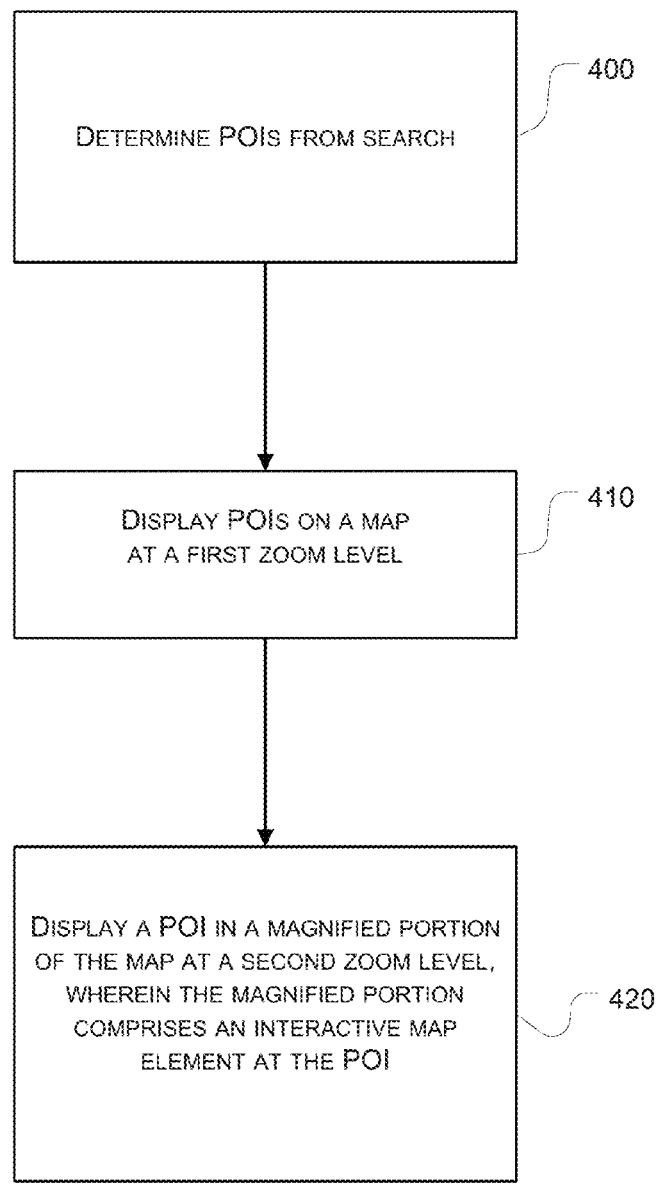
FIG. 4 is a flowchart outlining steps of a related method of magnifying one or more points of interest in accordance with implementations of the present technology.

Another application of this technology is magnifying points of interest (POI's) on a map. FIG. 4 is a flowchart outlining a method of magnifying one or more points of interest. The method includes determining (400) POI's from a search, e.g. a text string search using a web search engine. The method then includes displaying (410) POI's on a map at a first zoom level. The method also includes displaying (420) a POI in a magnified portion of the map at a second zoom level in which the magnified portion comprises an interactive map elements at the POI.

Figure 5:
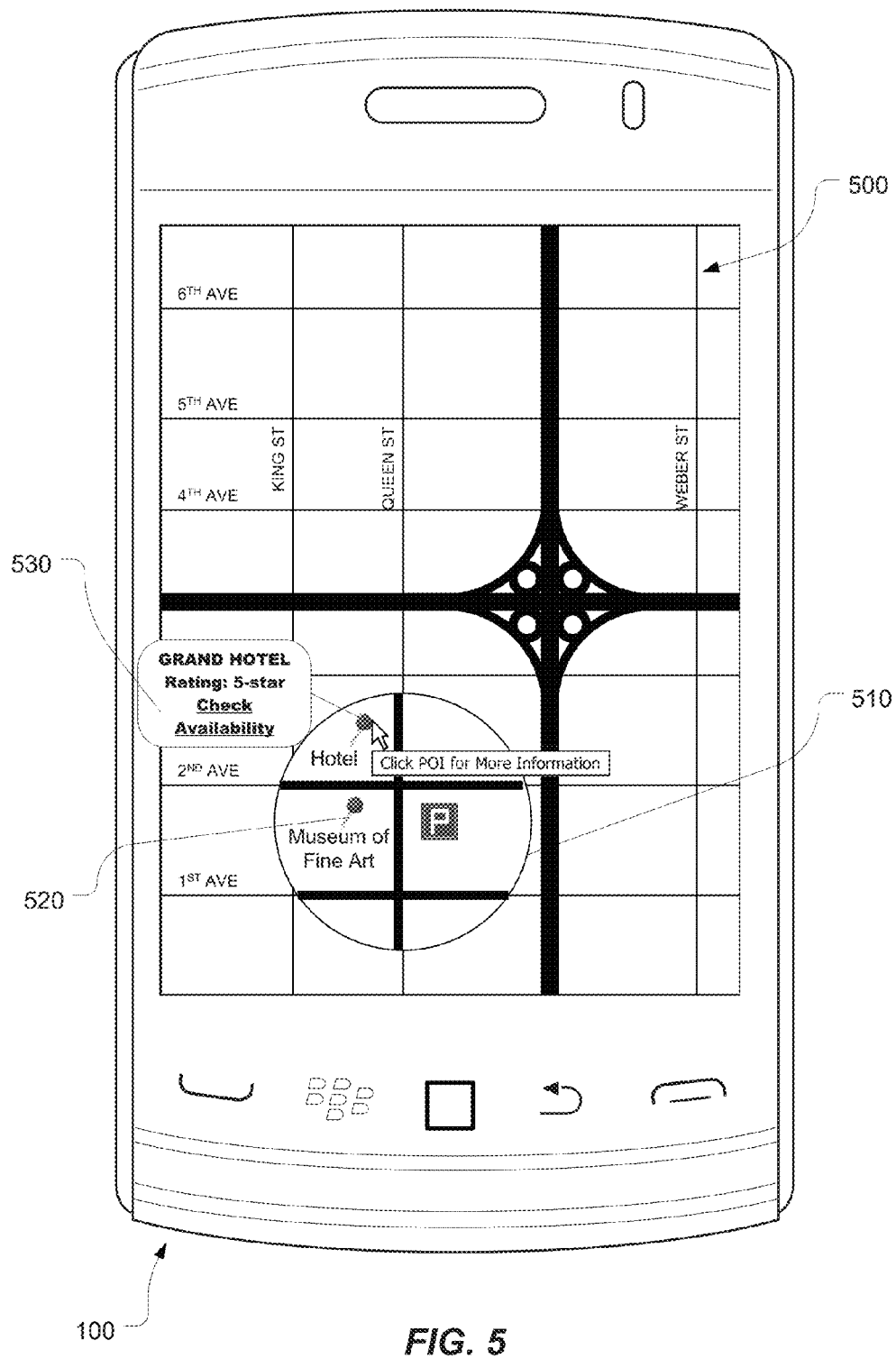
FIG. 5 is a depiction of a map magnifier overlaid on a map displayed on a mobile device, wherein the map magnifier includes an interactive map element in the form of a pushpin marker designating a point of interest.

FIG. 5 is a depiction of a map magnifier 510 overlaid on a map 500 displayed on a mobile device 100. The map magnifier 510 includes an interactive map element 520 in the form of a pushpin marker designating a point of interest (POI). By interacting with the interactive map element 520, further information 530 is presented visually and/or audibly. In this example, the further information 530 takes the form of a floating text box, balloon or bubble that depicts additional information about the POI in response to user input on the interactive map element 520.

This novel technology may be useful for a number of different applications such as, for example, displaying results of a local search on a map. Conventionally, search results may be mapped by displaying the locations of establishments, points of interest or the like using pushpins, icons or other map markers. The map is conventionally scaled so that all or a predetermined number of pushpins can be displayed on the map at the same time. To view details of any one location conventionally requires zooming in on the pushpin. To overcome this problem, the present technology uses the map magnifier to magnify one or more of the points of interest (pushpin locations). In one implementation, the pushpin location corresponding to the first search result is automatically magnified. The user can then jump or navigate to the other pushpin locations by clicking, hovering or touching the next search result in the list or by touching or clicking the onscreen pushpin or other marker. This implementation will be further described with respect to the example presented in the following figures.

Figure 6:
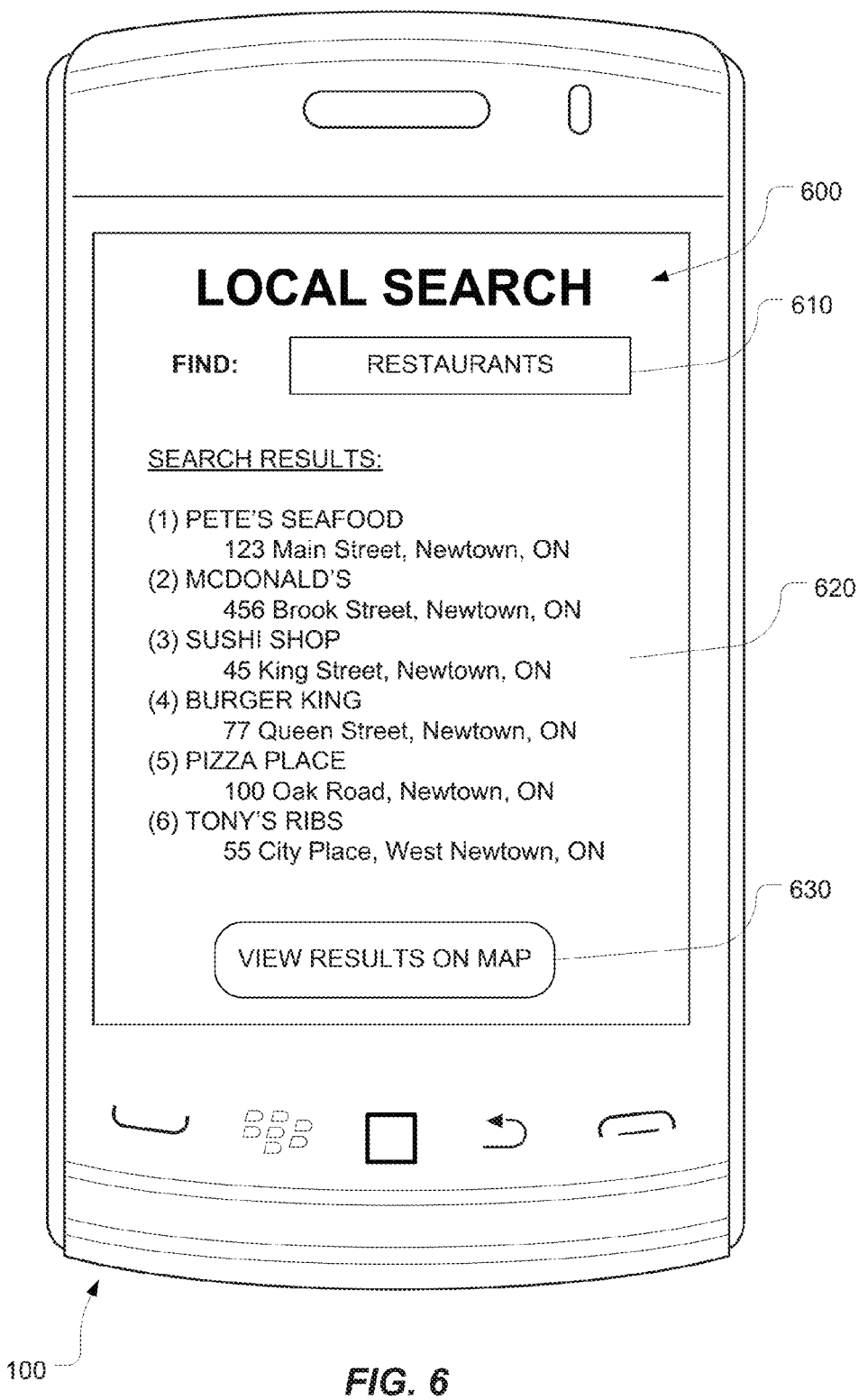
FIG. 6 is a depiction of a mobile device displaying local search results.

FIG. 6 is a depiction of a mobile device 100 displaying local search results on a local search interface 600. The interface 600 comprises a search field 610 for inputting a textual search query ("restaurants"). Search results 620 are presented onscreen. An interface element 630 enables the viewing of results on a map. Such a map is presented by way of example in FIG. 7. The mobile device 100 displays a map 700 that presents pushpin markers 730 at locations corresponding to each one of the local search results. A first one of the search result locations is identified and along with its surrounding area (demarcated by dashed circle 710). This represents the immediate vicinity of the POI to be enlarged/magnified. This area is configurable by the user or it can be determined as a function of the map size, screen size, number of POIs, etc.

Figure 7:
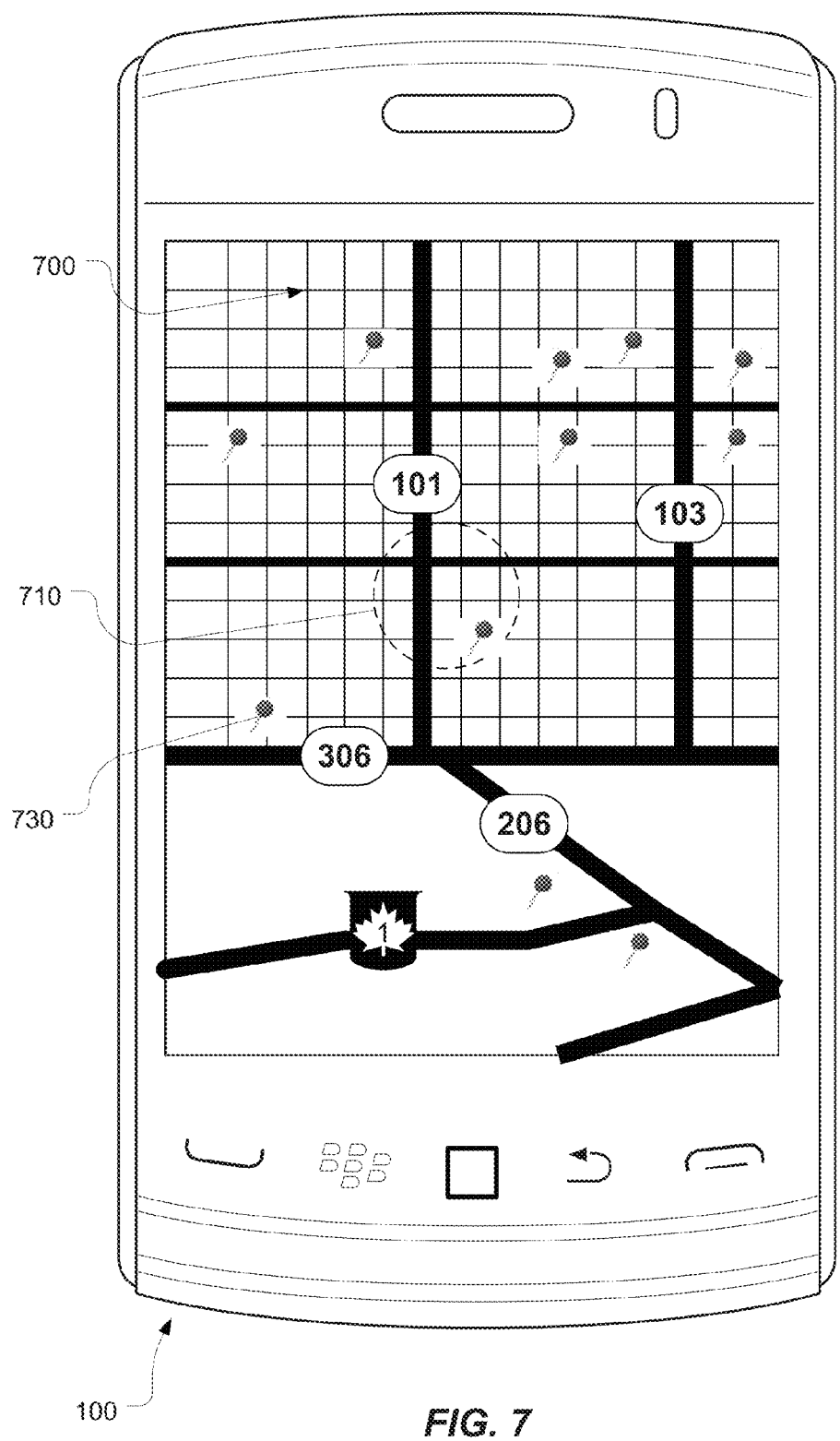
FIG. 7 is a depiction of a mobile device displaying a map that presents pushpin markers at locations corresponding to each one of the local search results.
Figure 8:
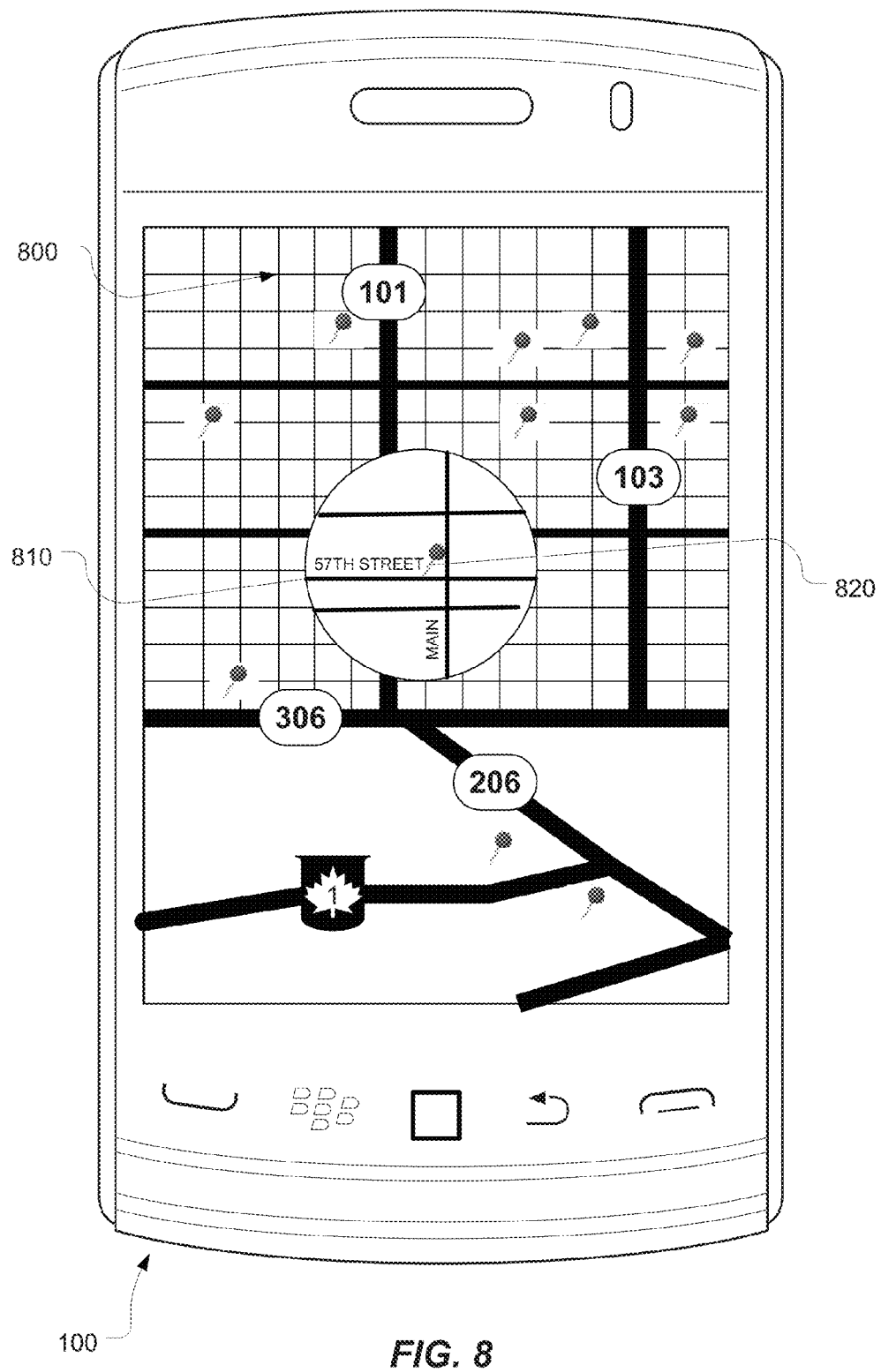
FIG. 8 is a depiction of a mobile device displaying the same map as in FIG. 7 but with a map magnifier over one of the pushpin locations.

FIG. 8 is a depiction of the mobile device 100 displaying the same map as in FIG. 7 (but now designated as map 800). A map magnifier 810 is provided over one of the pushpin locations 820. Details of the immediate vicinity of the POI are now visible because the magnified portion is zoomed to a higher level than the underlying map.

Figure 9:
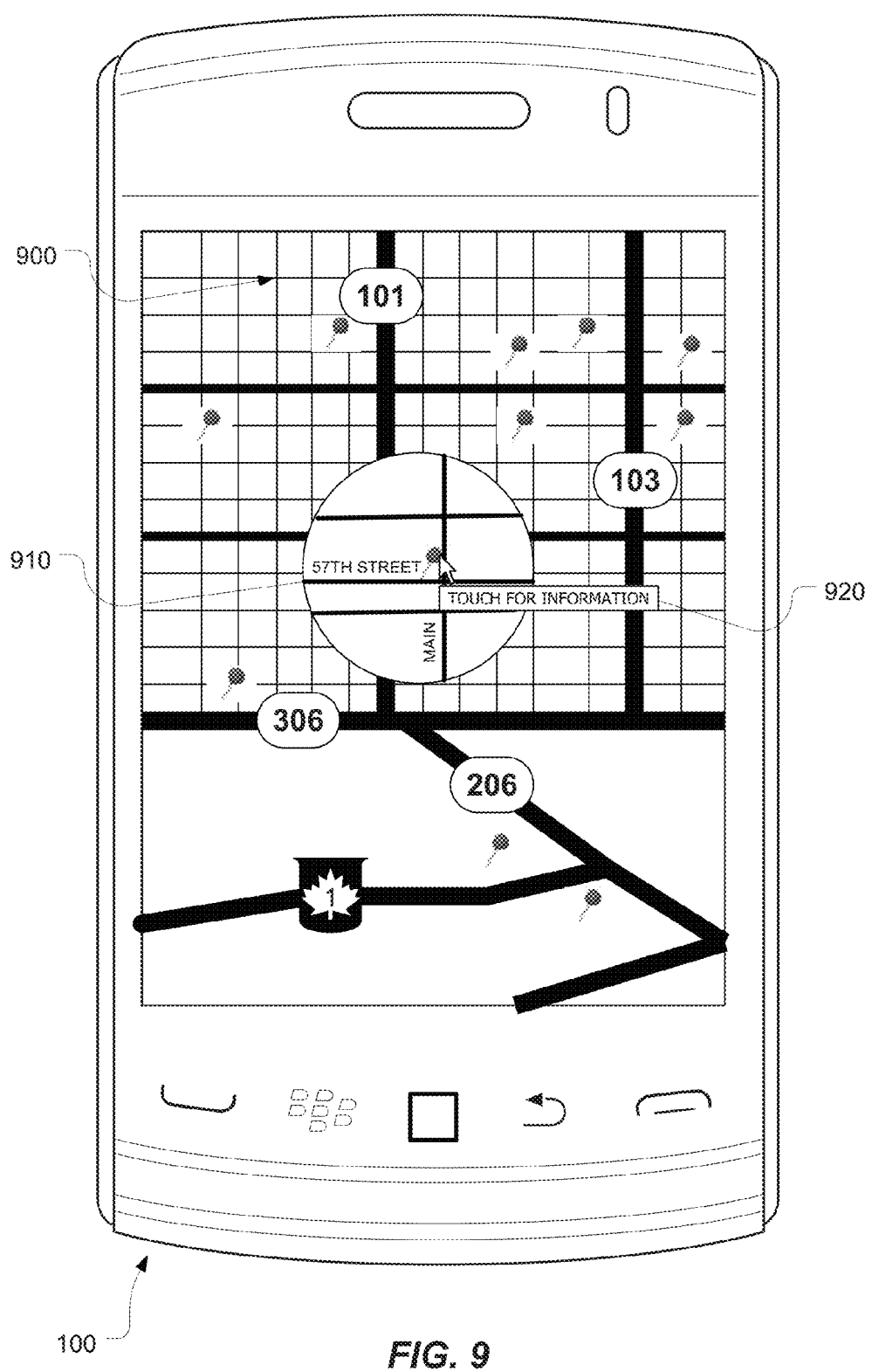
FIG. 9 is a depiction a mobile device displaying the same image as in FIG. 8, further illustrating how the pushpin marker acts as an interactive map element that can be touched to obtain more information about the establishment or entity represented by the pushpin marker.

FIG. 9 is a depiction a mobile device displaying the same image as in FIG. 8, further illustrating how the pushpin marker acts as an interactive map element that can be touched to obtain more information about the establishment or entity represented by the pushpin marker. In this example, the interactive map element 920 displayed within the magnified portion 910 which is overlaid over map 900 includes a textual prompt (a floating text box, balloon or the like) to indicate that more information is available upon touching the interactive map element. Upon receipt of touch input, as shown by way of example in FIG. 10, the mobile device 100 presents more information 1020 about the POI. This information may be presented in a floating text box, balloon or the like. In other words, the information balloon 1020, which provides information about the establishment or POI represented by the pushpin marker, is retrieved and presented in response to user input received by the interactive map element.

Figure 10:
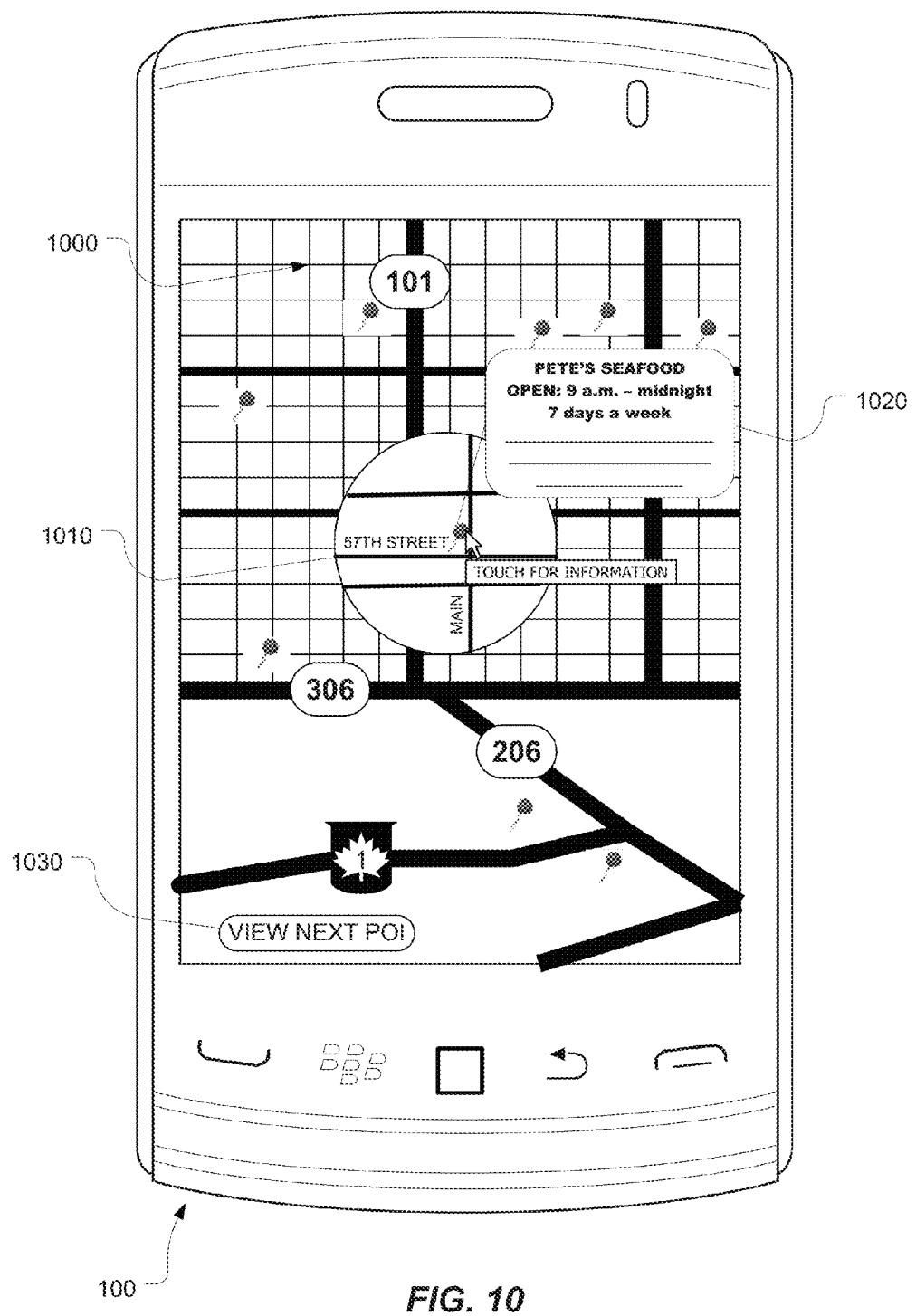
FIG. 10 depicts the displaying of an information balloon providing information about the establishment represented by the pushpin marker, the information balloon being presented in response to user input received by the interactive map element.

As further depicted by way of example in FIG. 10, a user interface element 1030 may be provided to enable viewing of the next POI in the list of search results. The next POI may be coloured or shaded on the map 1000 to indicate that it is the next POI in the list. It is to be noted that the user may continue to interact not only with the POI magnified inside the map magnifier 1010 but also with any other POI displayed on the underlying map 1000.

Figure 11:
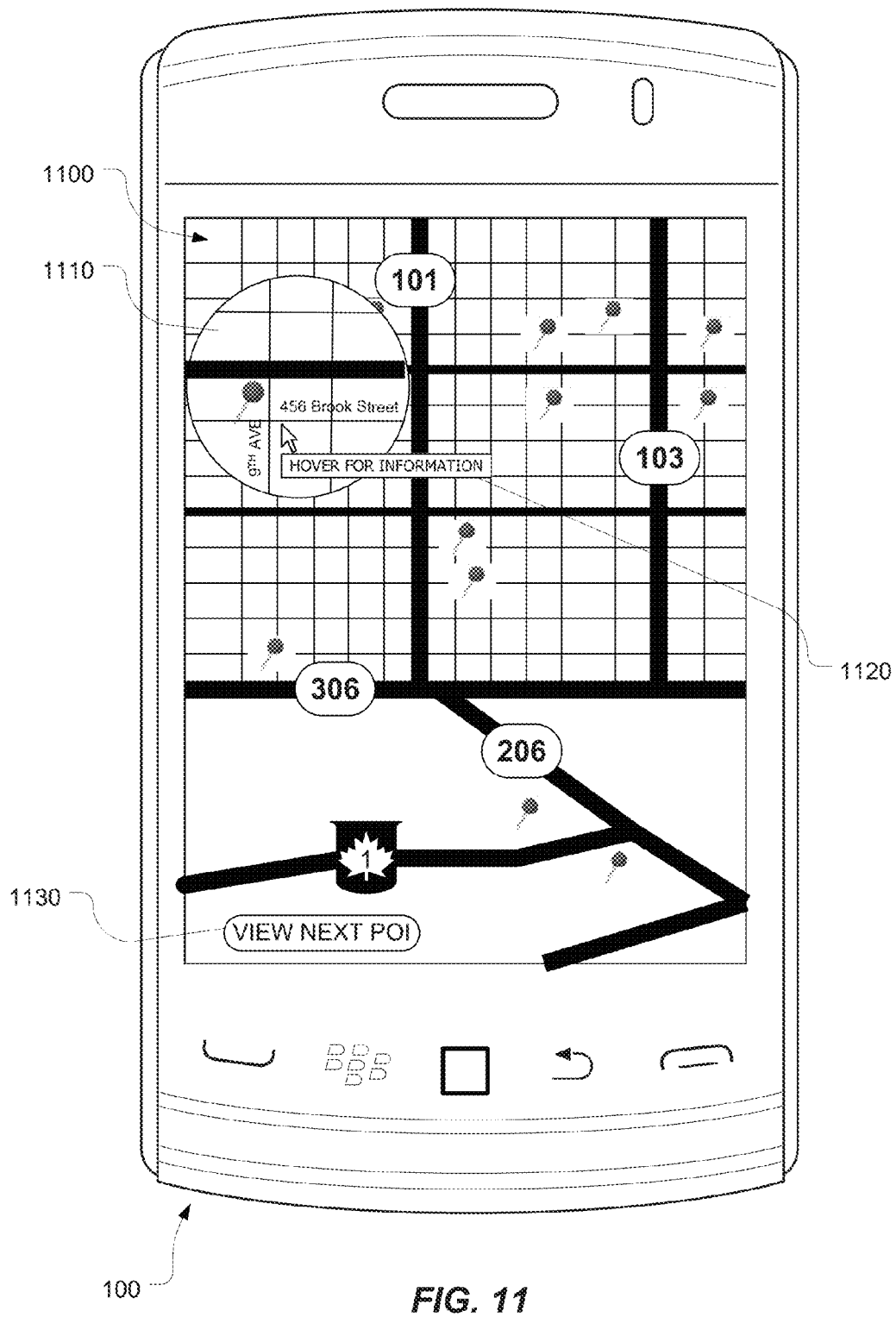
FIG. 11 depicts how the map magnifier may be displaced to the next point of interest listed in the local search results.

FIG. 11 depicts how the map magnifier 1110 may be displaced to the next point of interest listed in the local search results. The map magnifier 1110 for map 1100 includes a text prompt 1120 that informs the user that more information can be obtained by interacting with the interactive map element displayed in the map magnifier 1110. In this particular example, the text prompt 1120 notifies the user that more information about the POI may be obtained by hovering over the POI. As further shown by way of example in this figure, the next POI may be magnified by providing user input to the user interface element 1130 ("View Next POI").

In the foregoing examples, only a single POI is magnified at one time. However, in other implementations, the device may magnify more than one POI. When two or more POI's are clustered tightly together, a single map magnifier can magnify the two or more POI's. In another implementation, multiple map magnifiers may be employed to simultaneously magnify two or more POI's.

Figure 12:
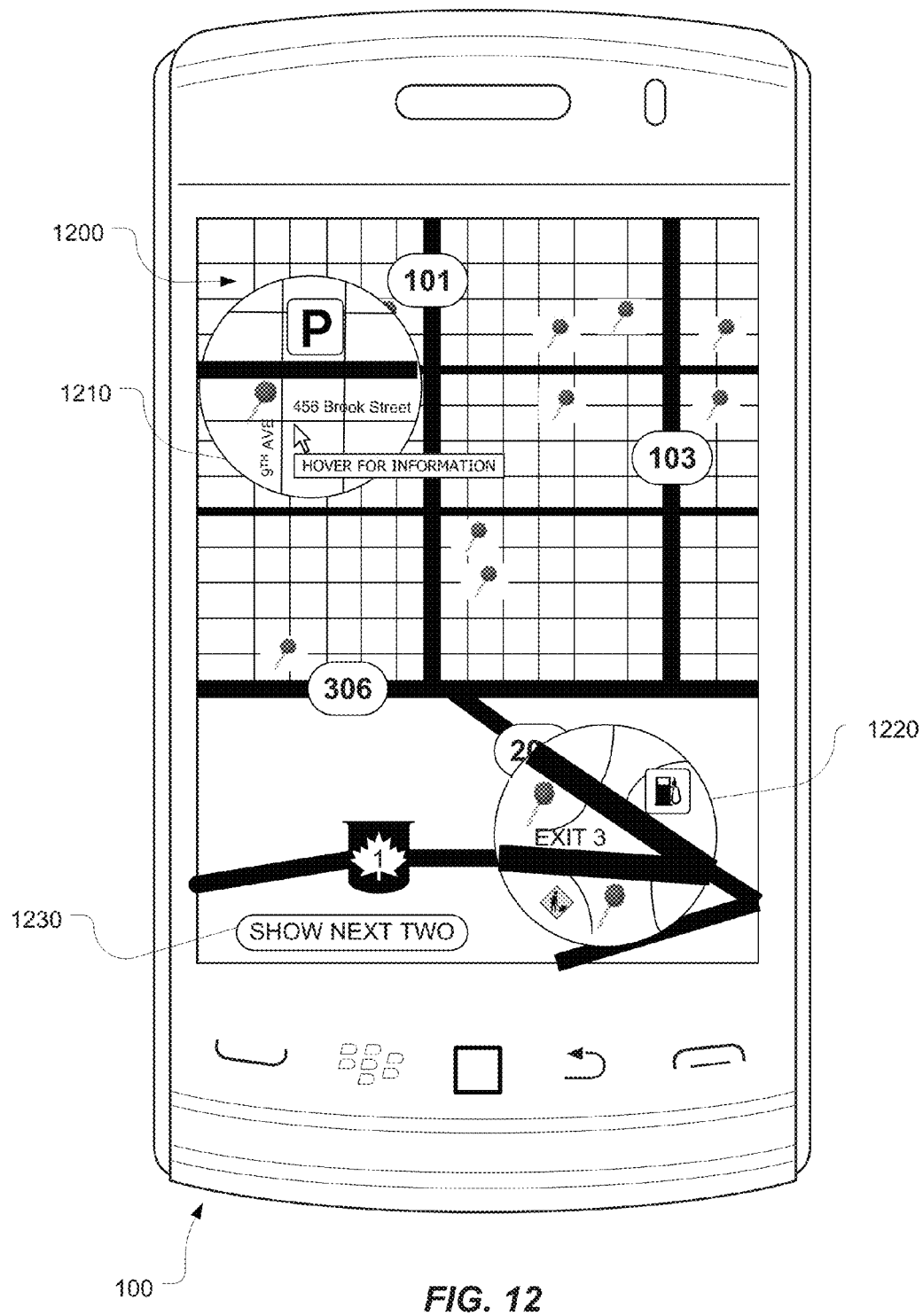
FIG. 12 depicts the simultaneous displaying of multiple map magnifiers on the same map.

FIG. 12 depicts the simultaneous displaying of multiple map magnifiers 1210, 1220 on the same map 1200. In this example, the user interface element 1230 enables the viewing of the next two POI's in the list of search results.

As introduced above, the technology may be applied to a navigation application to magnify waypoints, decision points, forks, splits or intersections along a route. The route may be a programmed route or a predicted route based on a current direction of travel and/or any historical travel data or usage patterns, etc.

Figure 13:
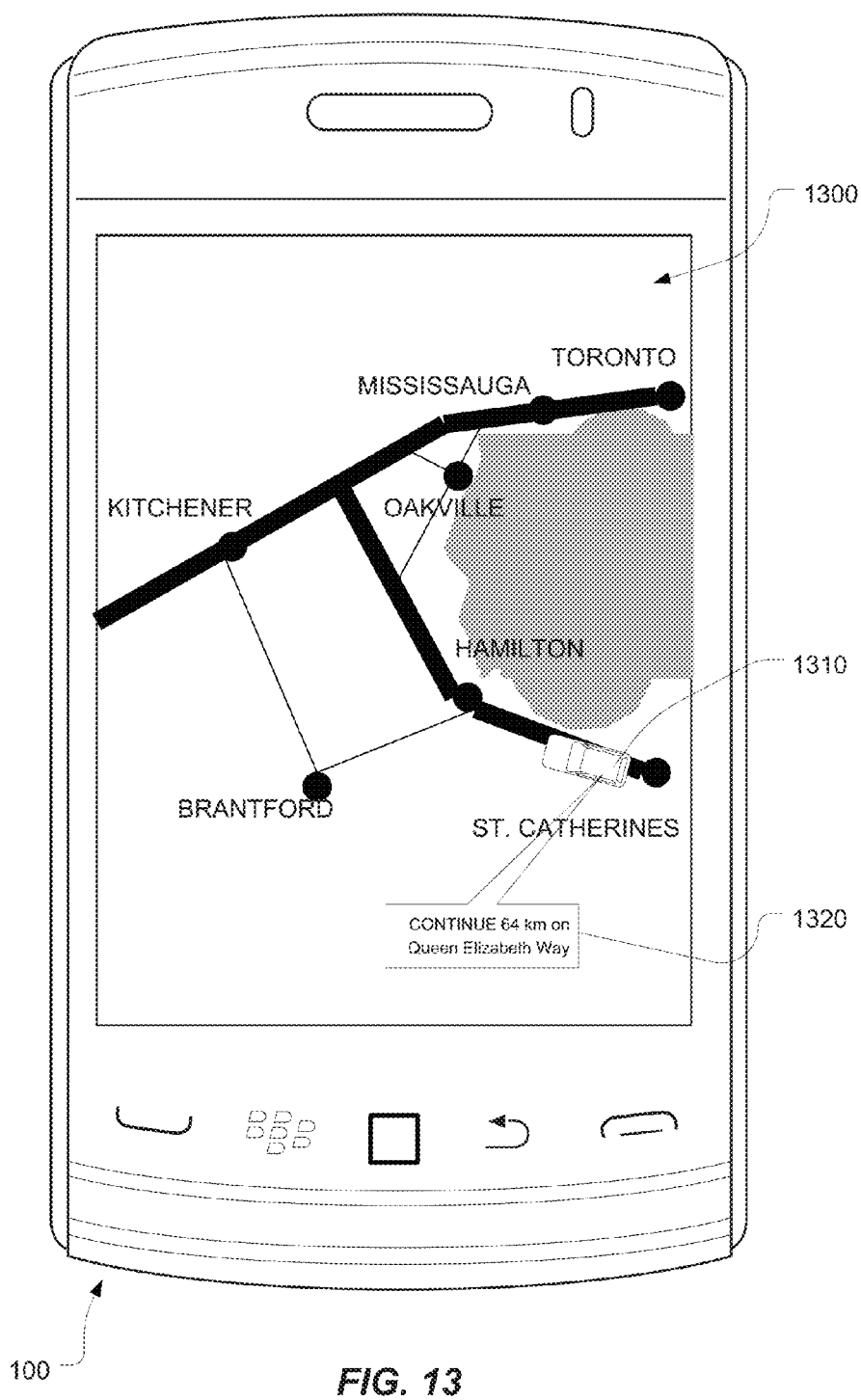
FIG. 13 depicts a mobile device displaying a map for navigating from one city to another city by following a programmed route having one or more waypoints or decision points.

FIG. 13 depicts a mobile device 100 displaying a map 1300 for navigating from one city to another city by following a programmed route having one or more waypoints or decision points. In this example, the map shows a current position indicator 1310 in the form of a car in which the mobile device 100 is traveling. In this example, the mobile device 100 is traveling along a programmed route and is using a navigation application on the device to provide turn-by-turn navigation instructions to the user of the mobile device. The navigation instructions 1320 may be visual and/or audible. In this particular example, the mobile device 100 is traveling in a vehicle along a programmed route from St. Catherines to Kitchener via Hamilton.

Figure 14:
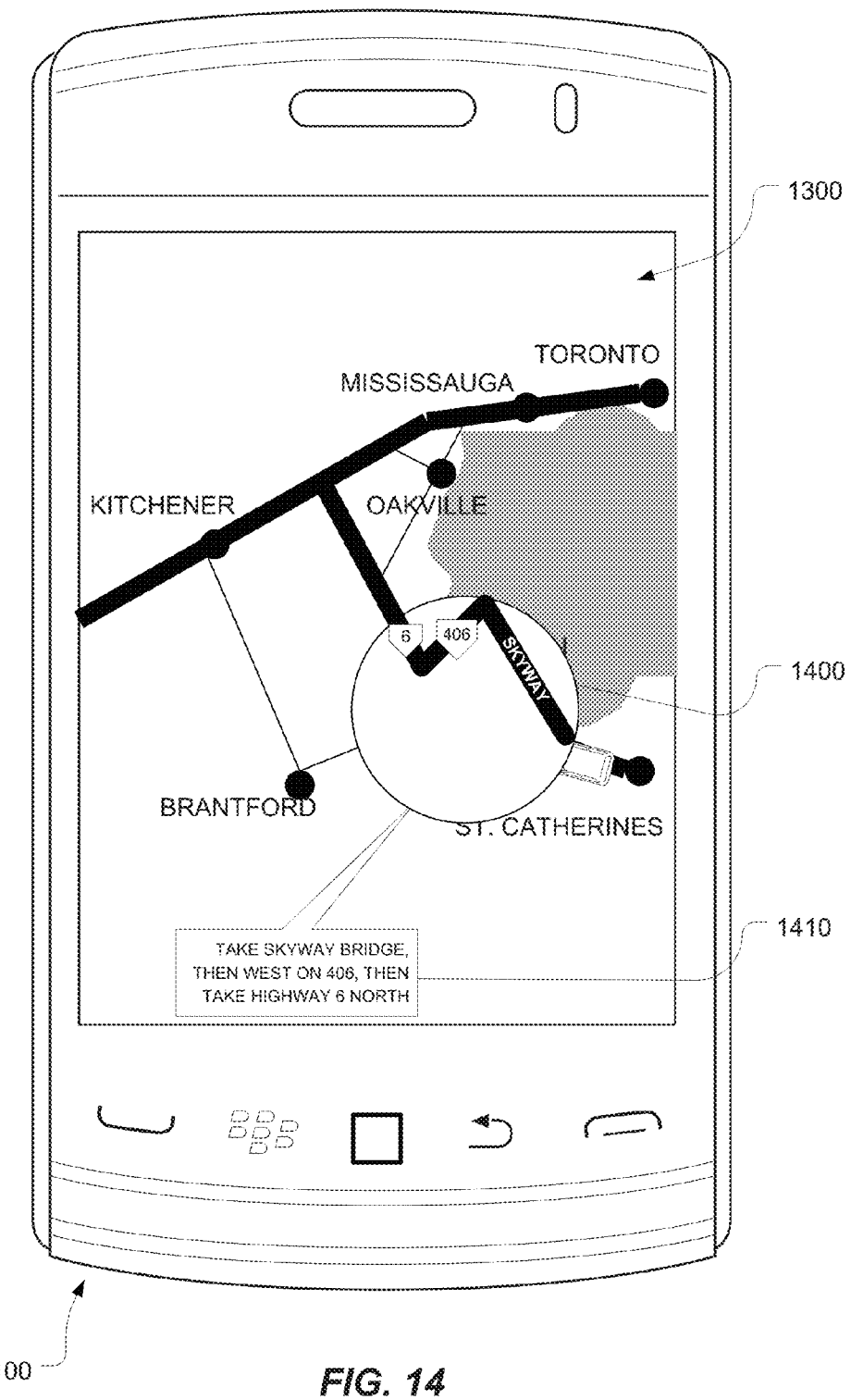
FIG. 14 depicts the same map displayed with a first waypoint magnified using a map magnifier.

FIG. 14 depicts the same map 1300 displayed with a first waypoint magnified using a map magnifier 1400. The first waypoint is at Hamilton in this example. Navigation instructions 1410 may be provided while the waypoint is being magnified.

Figure 15:
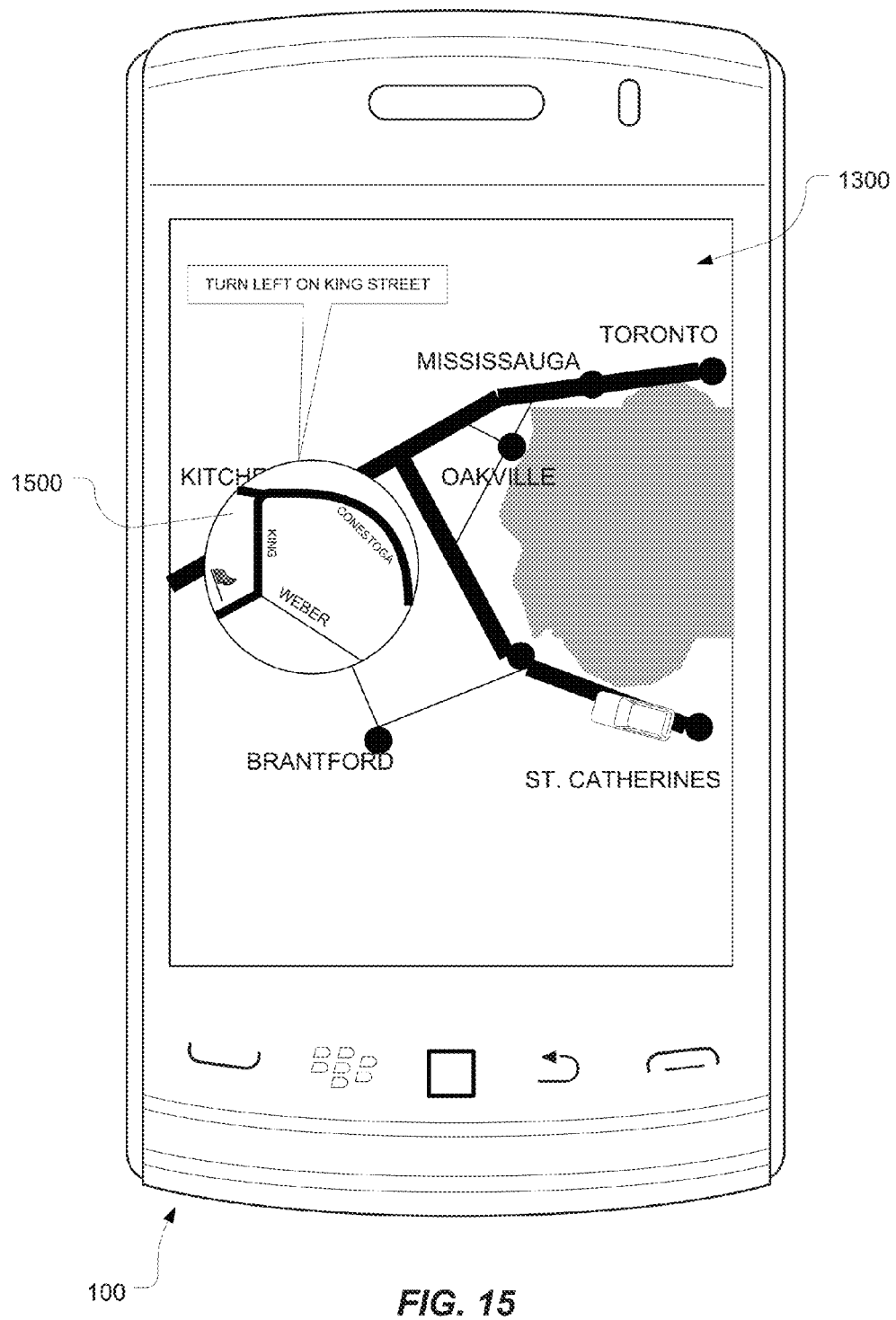
FIG. 15 depicts the same map displayed with a second waypoint magnified using a map magnifier.

FIG. 15 depicts the same map 1300 displayed with a second waypoint magnified using a map magnifier 1500. The second waypoint in this example occurs as the device reaches Kitchener. Navigation instructions may be provided while the waypoint is magnified.

Figure 16:
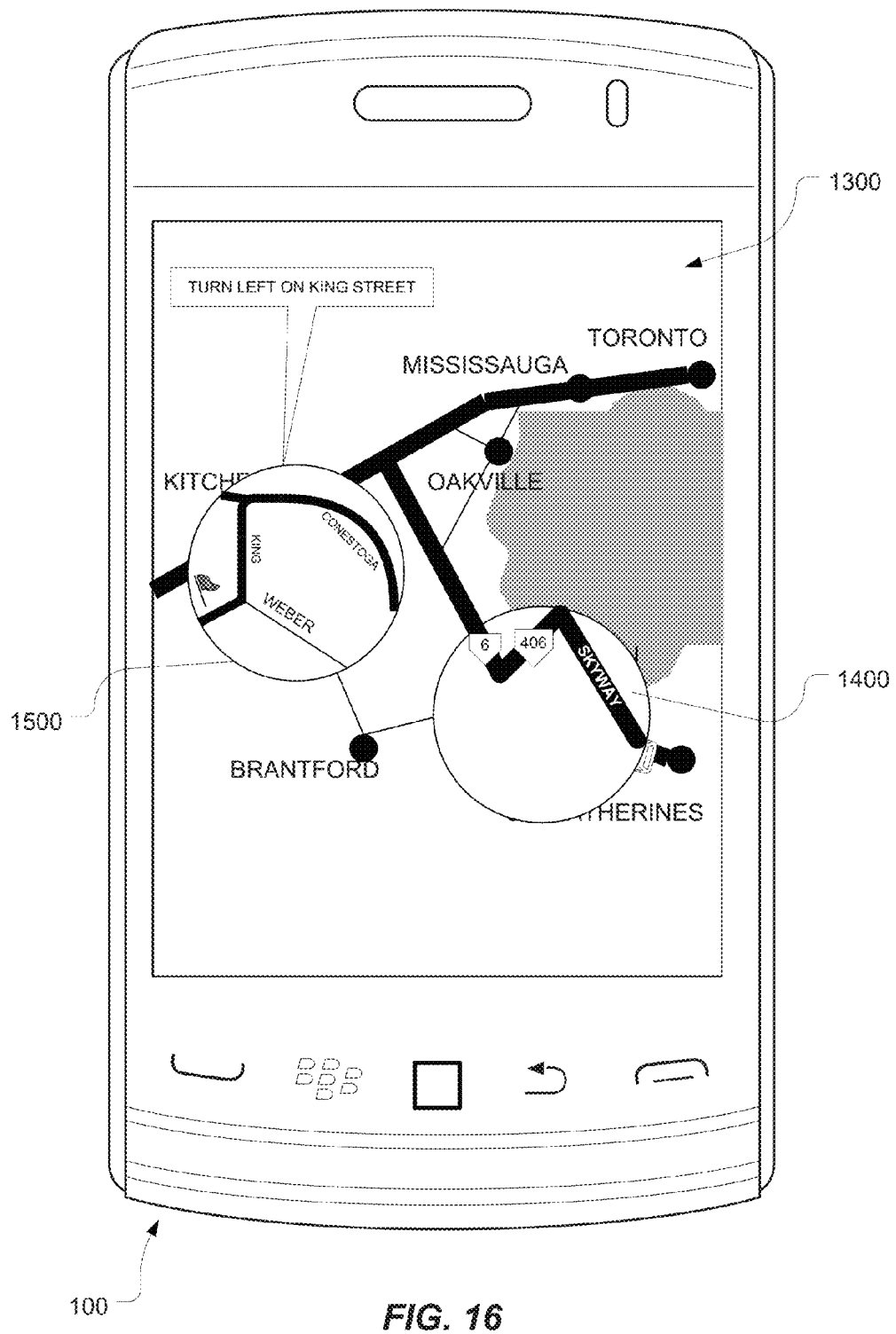
FIG. 16 depicts the same map displayed with two waypoints magnified by respective map magnifiers.

In another implementation, the device 100 may simultaneously magnify two or more waypoints along the route as shown by way of example in FIG. 16. In this example, two waypoints are simultaneously magnified by respective map magnifiers 1400, 1500. The sizing and positioning of the map magnifiers 1400, 1500 on the map 1300 may be adjusted automatically by the mobile device 100 to accommodate the simultaneous display of multiple map magnifiers.

In another implementation, the map magnifier may be used to magnify map features for which a user is searching. A user may wish to search, using any number of different search criteria, for map features satisfying the criteria. The criteria may be place names or labels or categories or types of map features (e.g. parks, lakes, restaurants, hospitals, train stations, airports, parking lots, etc.)

Figure 17:
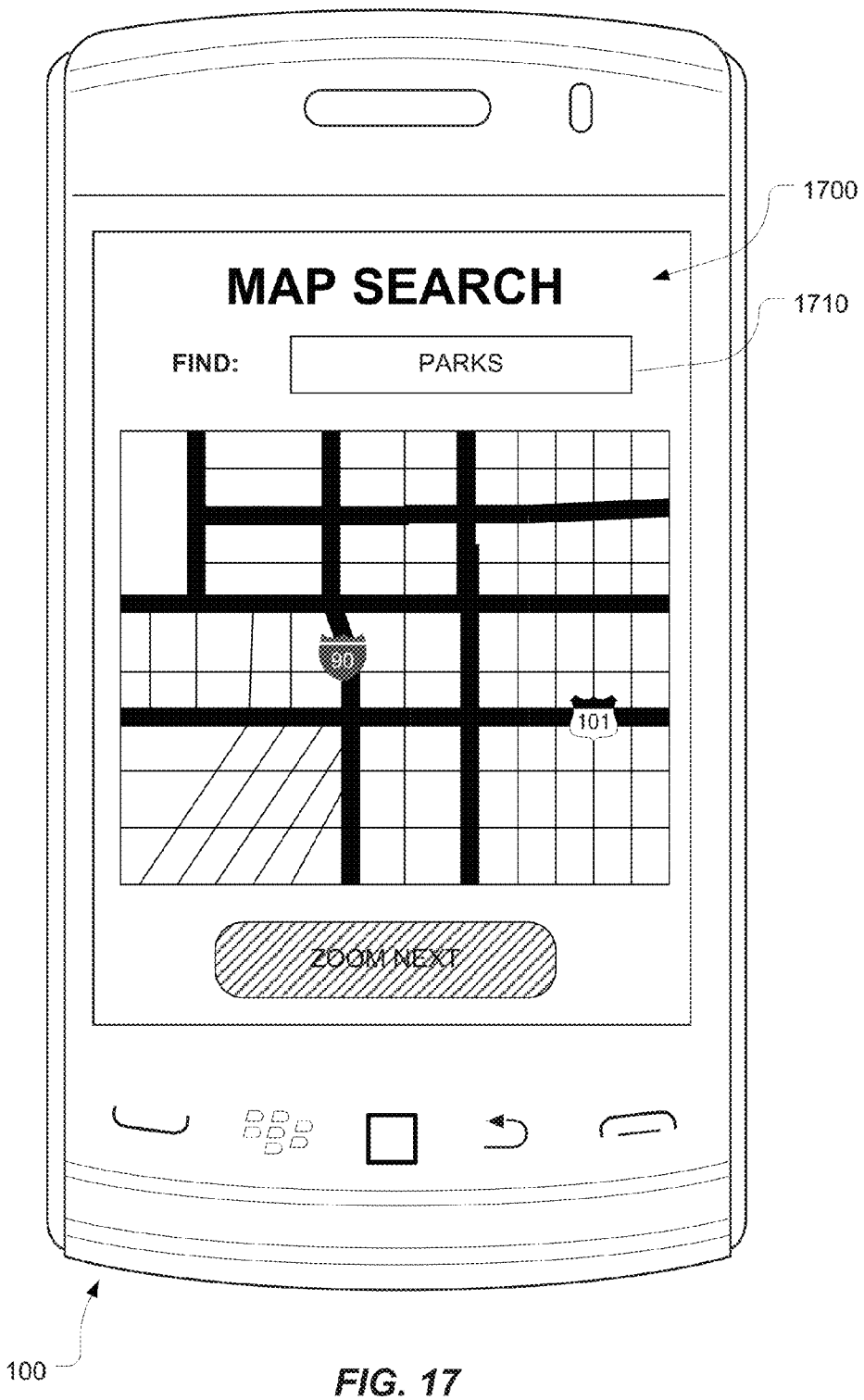
FIG. 17 is a depiction of a mobile device displaying a map and a search interface for searching for map features.

FIG. 17 is a depiction of a mobile device 100 displaying a map 1700 and a search interface 1710 for searching for map features. In this example, the user is searching for all parks. The search may be constrained geographically to a particular area of interest, which may be defined by what is currently displayed onscreen, by coordinates of latitude and longitude, or by a predetermined geographical entity (e.g. a certain city, county, state, country, etc.) In the particular example shown in FIG. 17, a search for all parks within the area of interest (AOI) currently displayed onscreen is performed.

Figure 18:
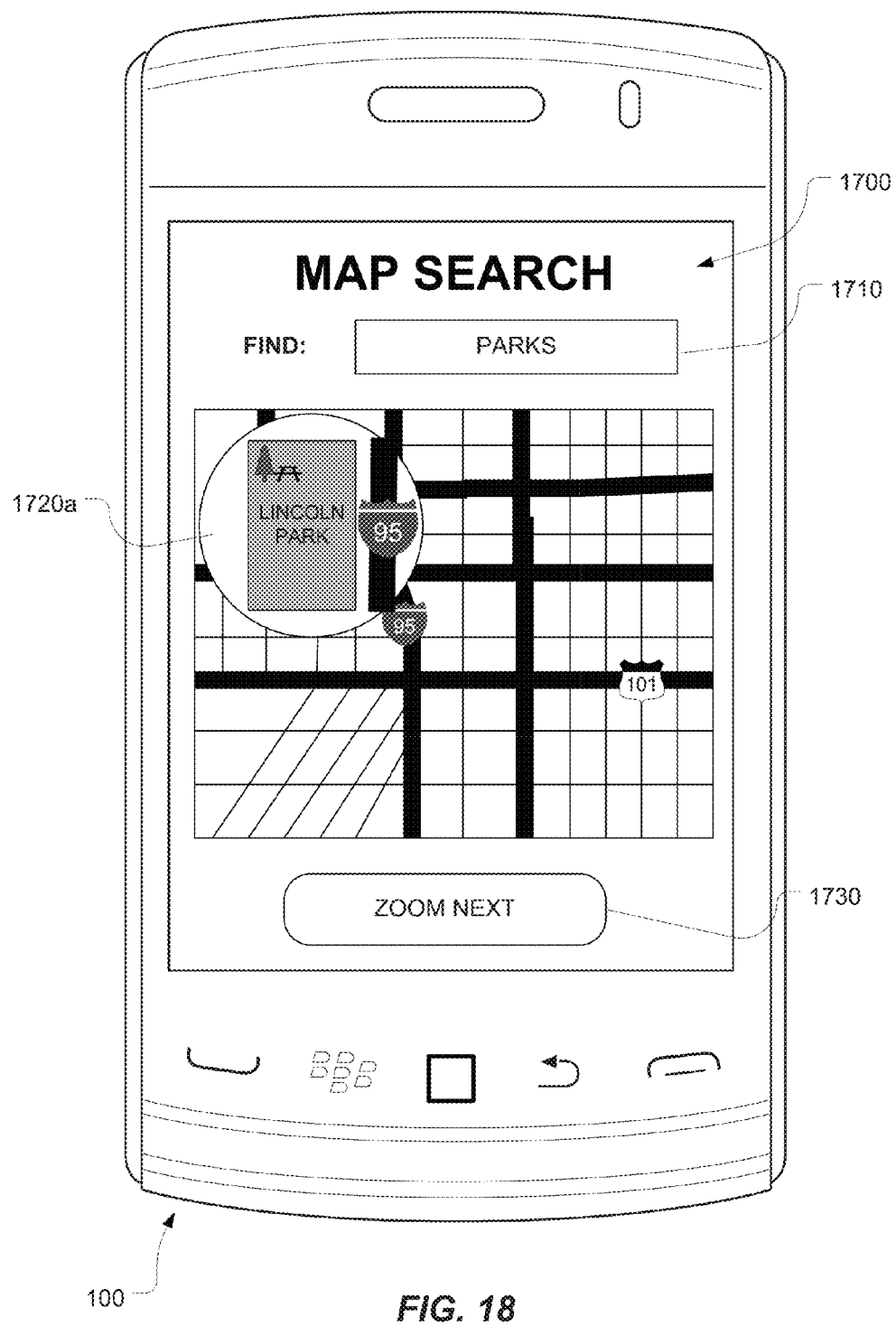
FIG. 18 depicts a map magnifier placed at the onscreen location of a first map feature that matches the search criterion.
Figure 19:
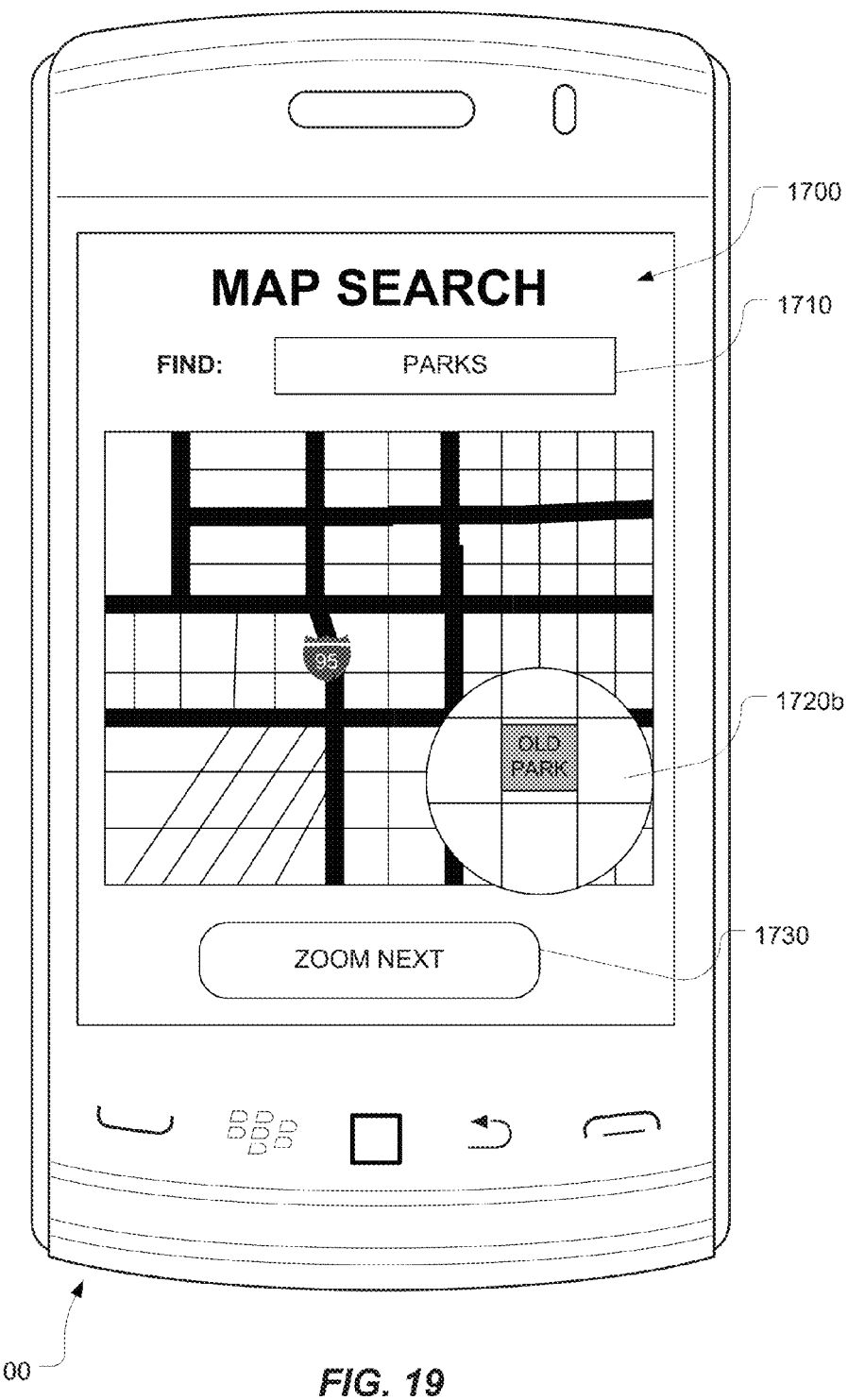
FIG. 19 depicts a mobile device having a user interface element for causing the map magnifier to jump to the next map feature matching the search criterion.

FIG. 18 depicts a map magnifier placed at the onscreen location of a first map feature that matches the search criterion. In this example, the search for parks within the AOI yields a number of search results ("hits"). The search results may be prioritized according to any number criteria, such as proximity to current location, size, search engine rank, etc. The first search result (the first park) in the example presented in FIG. 18 is Lincoln Park. The map magnifier 1720*a* is placed over Lincoln Park so the details of this map feature may be viewed at a higher zoom level. An optional user interface element 1730 may be provided to cause the map magnifier to jump to the next map feature in the list of search results. FIG. 19 depicts the mobile device 100 after the map magnifier

1720b has jumped to the next map feature (a park called "Old Park"). Assuming there is yet another park in the list of search results, the zoom next button 1730 is again displayed to enable navigation to this subsequent map feature.

Figure 20:
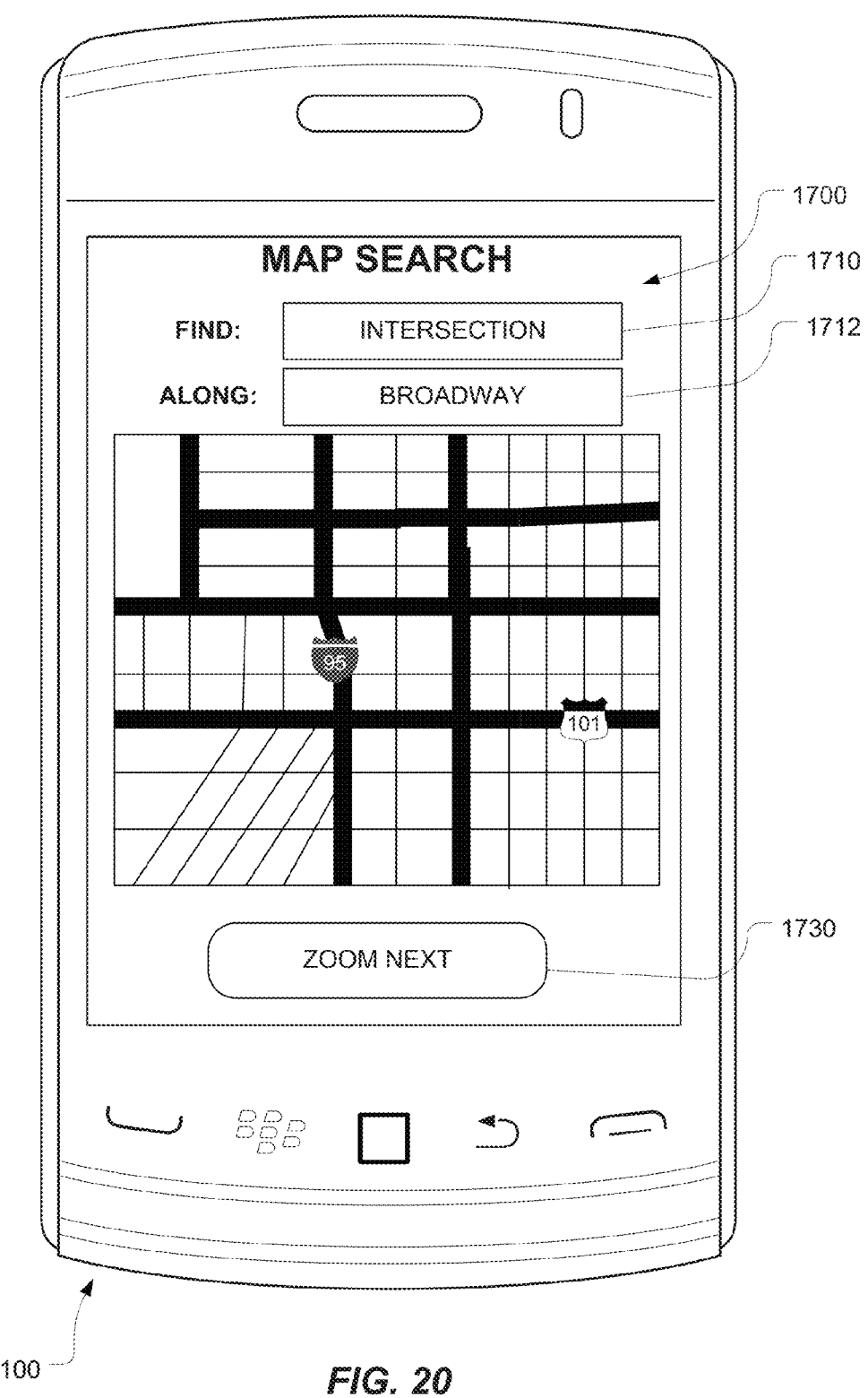
FIG. 20 depicts a map search interface that enables searching for intersection of a street map by jumping from one intersection to the next along a given road.

FIG. 20 depicts a map search interface that enables searching for intersections of a street map by jumping from one intersection to the next along a given road. In the example depicted in FIG. 20, the mobile device 100 displays a map search interface 1700 having multiple search fields 1710, 1712. In this particular example, the interface contains a find field 1710 for finding a category of map market (intersection, bus station, subway stop, gas station, restaurant, etc.) and an along field 1712 to define the roadway along which the search is to be performed. In this example, the user wishes to search all intersections along Broadway.

Figure 21:
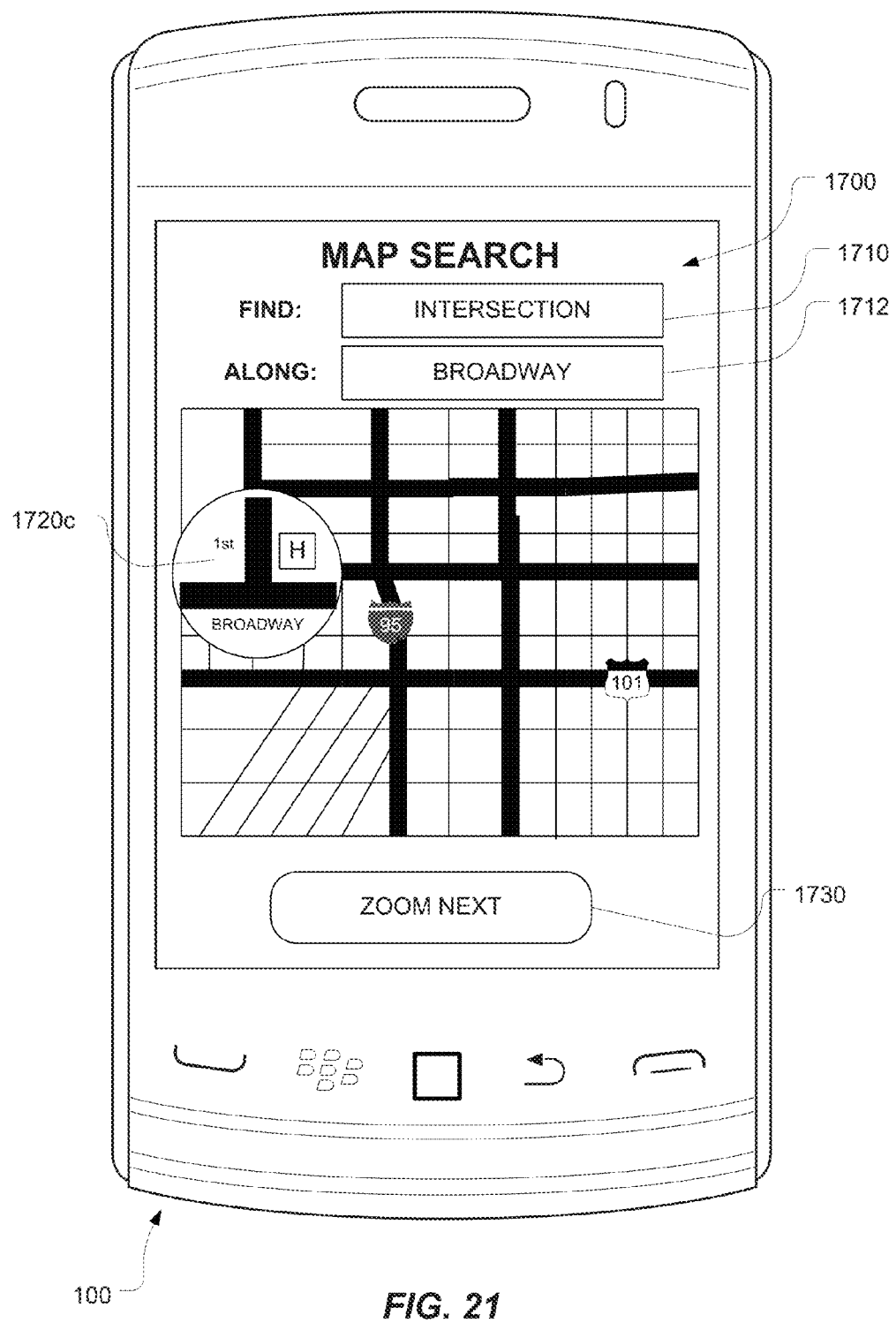
FIG. 21 depicts how the map magnifier magnifies the first intersection along a prescribed street.
Figure 22:
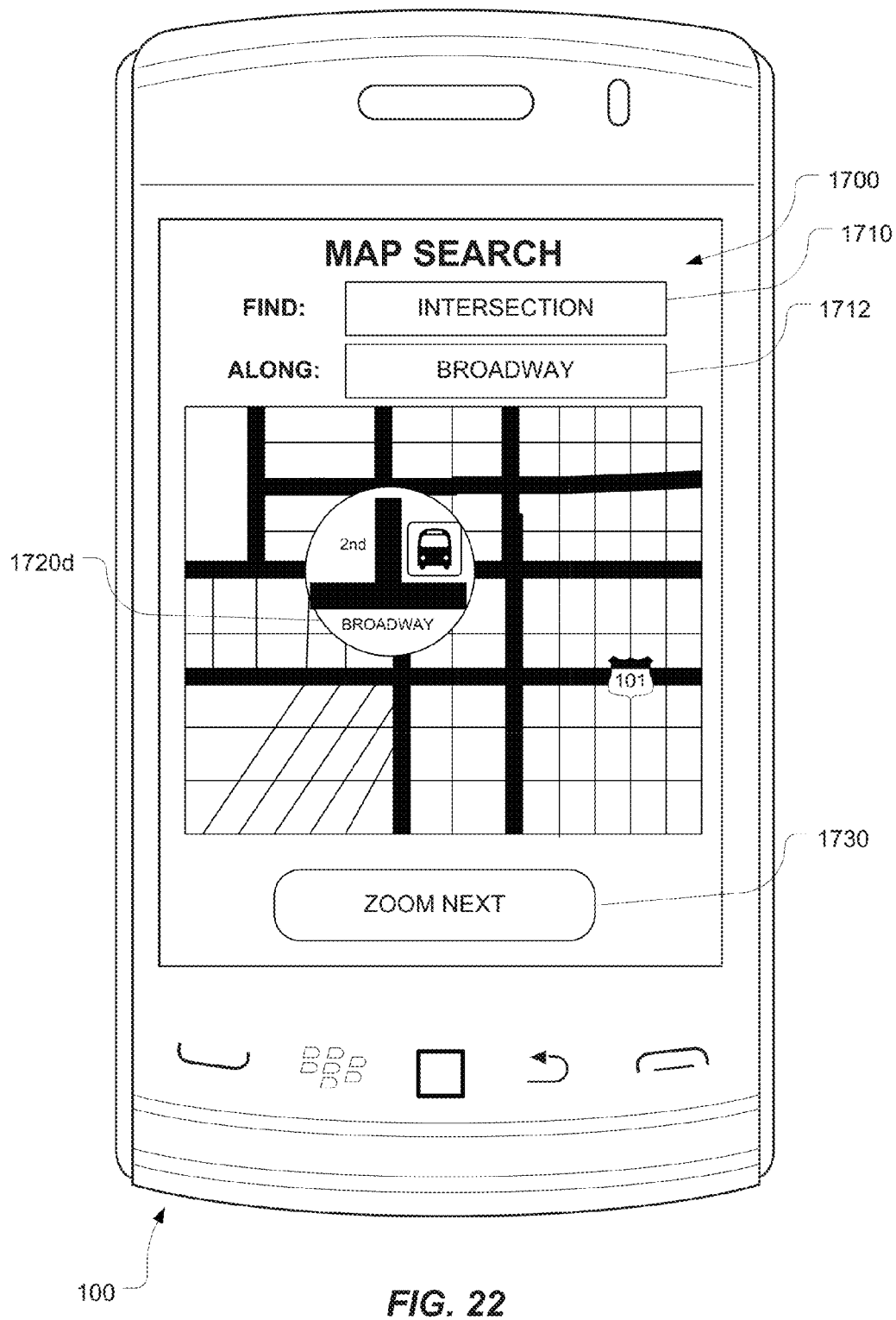
FIG. 22 depicts how the map magnifier is moved to the second intersection to magnify the second intersection.

FIG. 21 depicts how the map magnifier 1720c magnifies the first intersection along the prescribed street (in this case Broadway). The zoom next button 1730 can be touched or clicked to cause the map magnifier to jump to the next intersection as shown by way of example in FIG. 22. In this figure, the map magnifier 1720d has been moved to the second intersection along Broadway to magnify the second intersection, as shown. Using this technology, the user can jump from intersection to intersection until the user has found what he or she is looking for. The user may specify any other type or category of map feature, as noted above.

In another implementation, the map magnifier may be manually movable in response to touch input or other user input. The user may slide the map magnifier around the map, causing areas beneath the magnifier to be magnified (zoomed). This implementation does not require any keyword search, merely direct touch input or other user input on the map magnifier itself. For example, although park names and road names may not be displayed at low zoom levels, the user can still see the green patch representing the park or see the intersection of two main streets. The user can manually move or slide the map magnifier over these green patches or major intersections to magnify them.

Figure 23:
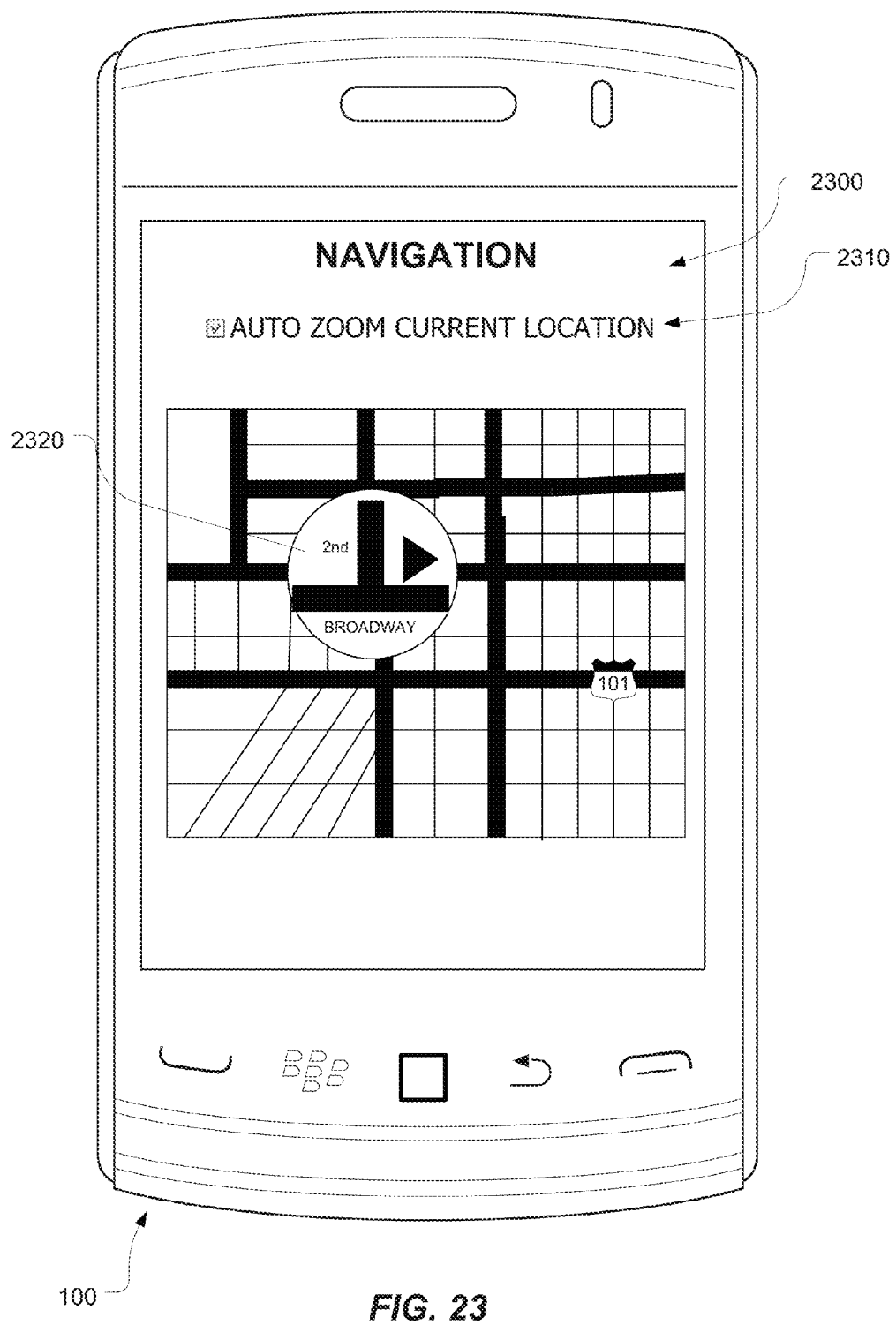
FIG. 23 depicts a mobile device displaying a navigation application that automatically places a map magnifier at the current location of the mobile device.

In another implementation, the mobile device 100 may determine its current position and automatically magnify an area on the map corresponding to the current position of the device. In other words, in this implementation of the technology, the map magnifier may be used to automatically magnify the current location of the mobile device while still presenting the remainder of the map at a lower zoom level. The magnifier can thus follow the current position as the mobile device moves around. FIG. 23 depicts an example of a mobile device 100 that displays a navigation application 2300 that automatically places a map magnifier 2320 at the current location of the mobile device. The magnified portion defined by the map magnifier contains one or more interactive map elements that, in its enlarged state, can be selected to cause the device to provide further information about a map element or object displayed within the magnified portion. The current location may be determined by the mobile device using GPS, A-GPS, WPS, radiolocation techniques, etc. Optionally, the navigation application may include a user interface element 2310 to enable or disable the automatic zooming of the current location. The size of the map magnifier may be user-configurable and/or automatically re-adjusted by the device based on the size of the map or other factors.

Figure 24:
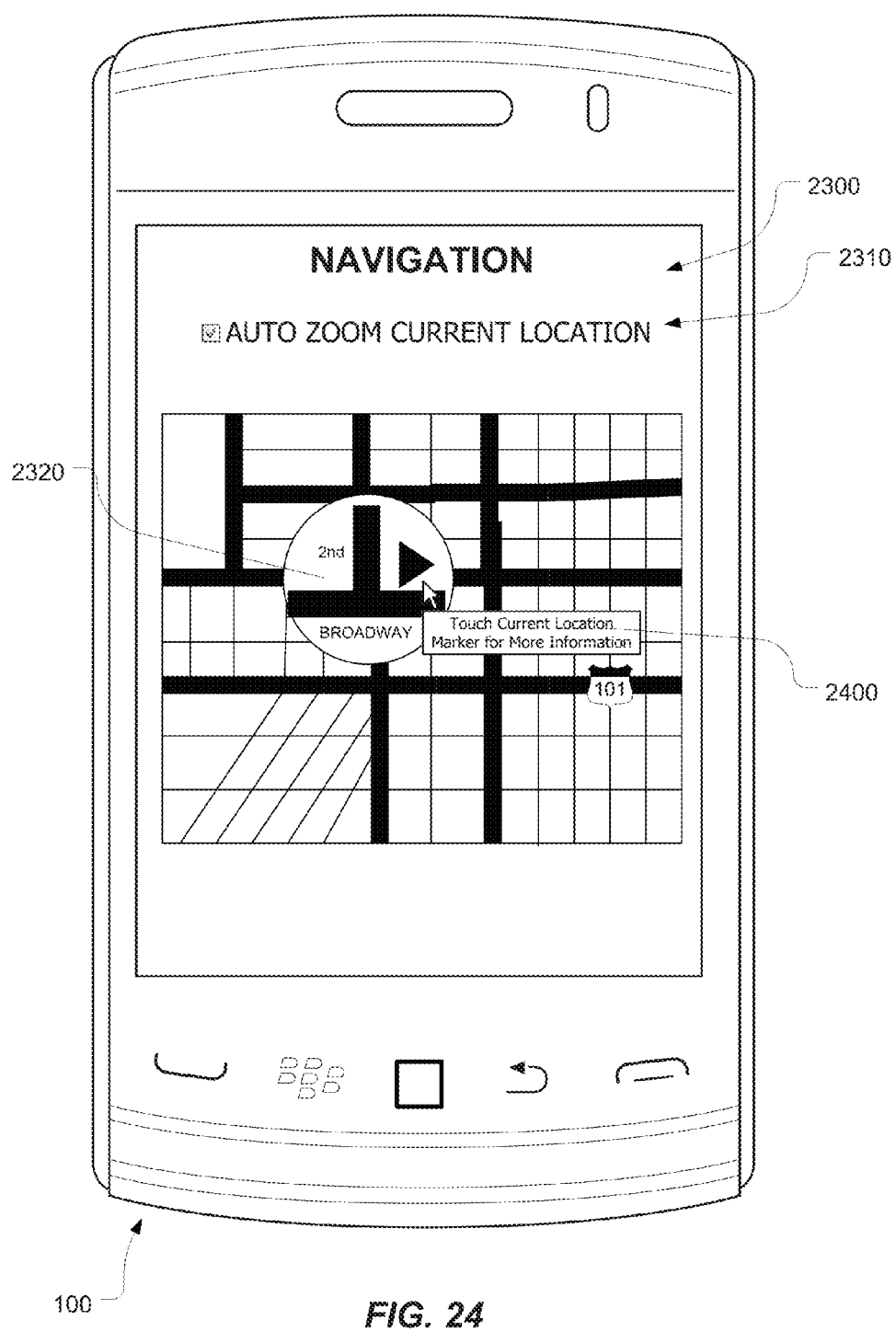
FIG. 24 depicts an interactive map element in the form of a triangular current position indicator that is displayed within the map magnifier and which can be touched to obtain more information about the current location of the mobile device.

FIG. 24 depicts an interactive map element 2400 in the form of a triangular current position indicator that is displayed within the map magnifier 2320 and which can be touched to obtain more information about the current location of the example touchscreen mobile device 100. In this particular example, the current position indicator (or current location marker) may include a text box or balloon to prompt the user to touch the current location marker 2400 for more information. Upon receiving touch input on the current position marker (or other such interactive map element), more information about the location is presented (audibly, visually, or both).

Figure 25:
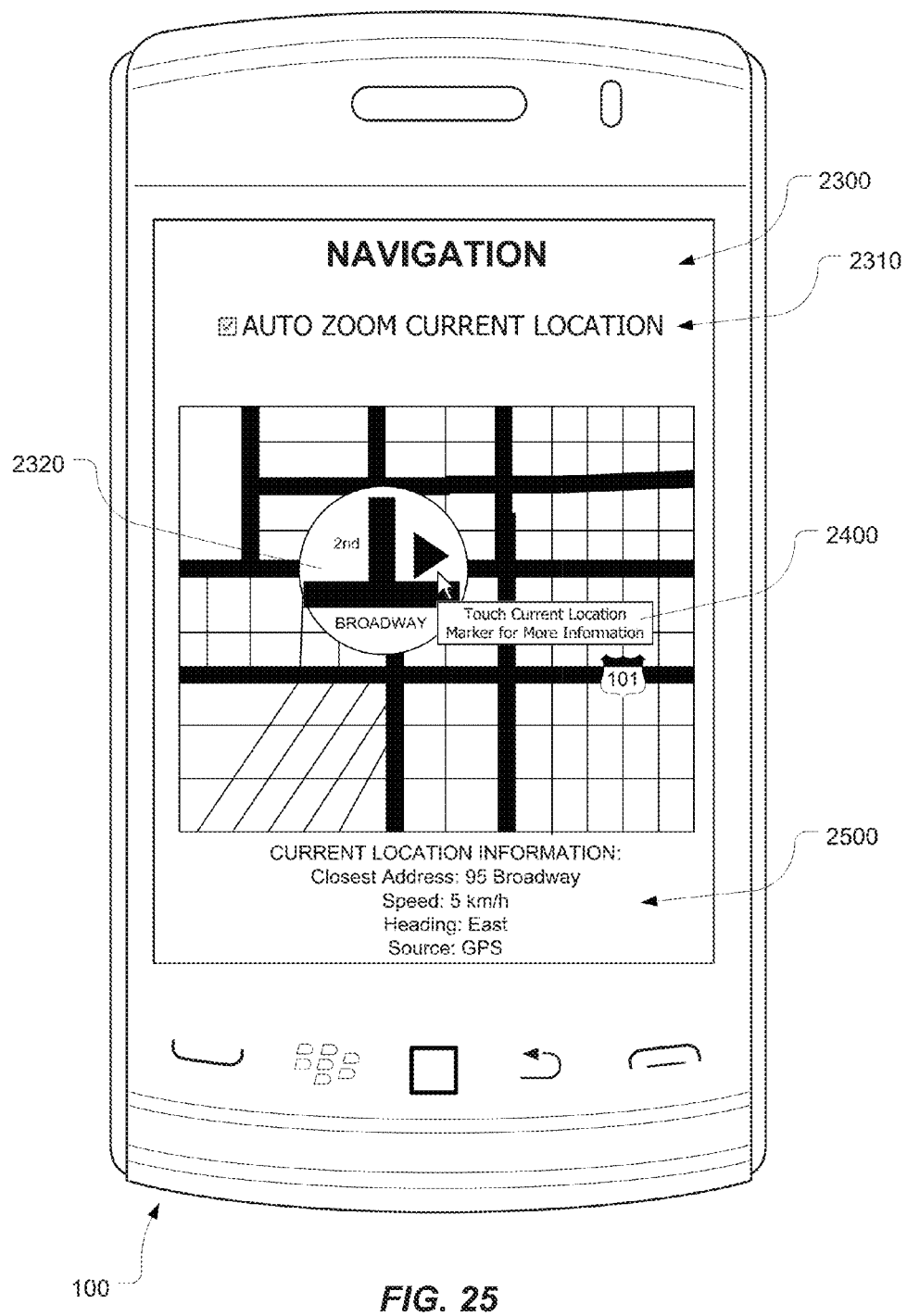
FIG. 25 depicts the displaying of current location information onscreen on the mobile device in response to touch input on the interactive map element displayed within the map magnifier.

FIG. 25 depicts the displaying of current location information 2500 onscreen on the mobile device 100 in response to touch input on the interactive map element 2400 displayed within the map magnifier 2320. This current location information may include the closest civic address, coordinates of latitude and longitude, speed, heading, and the source of the positioning data (GPS, WPS, A-GPS, radiolocation, etc.)

Figure 26:
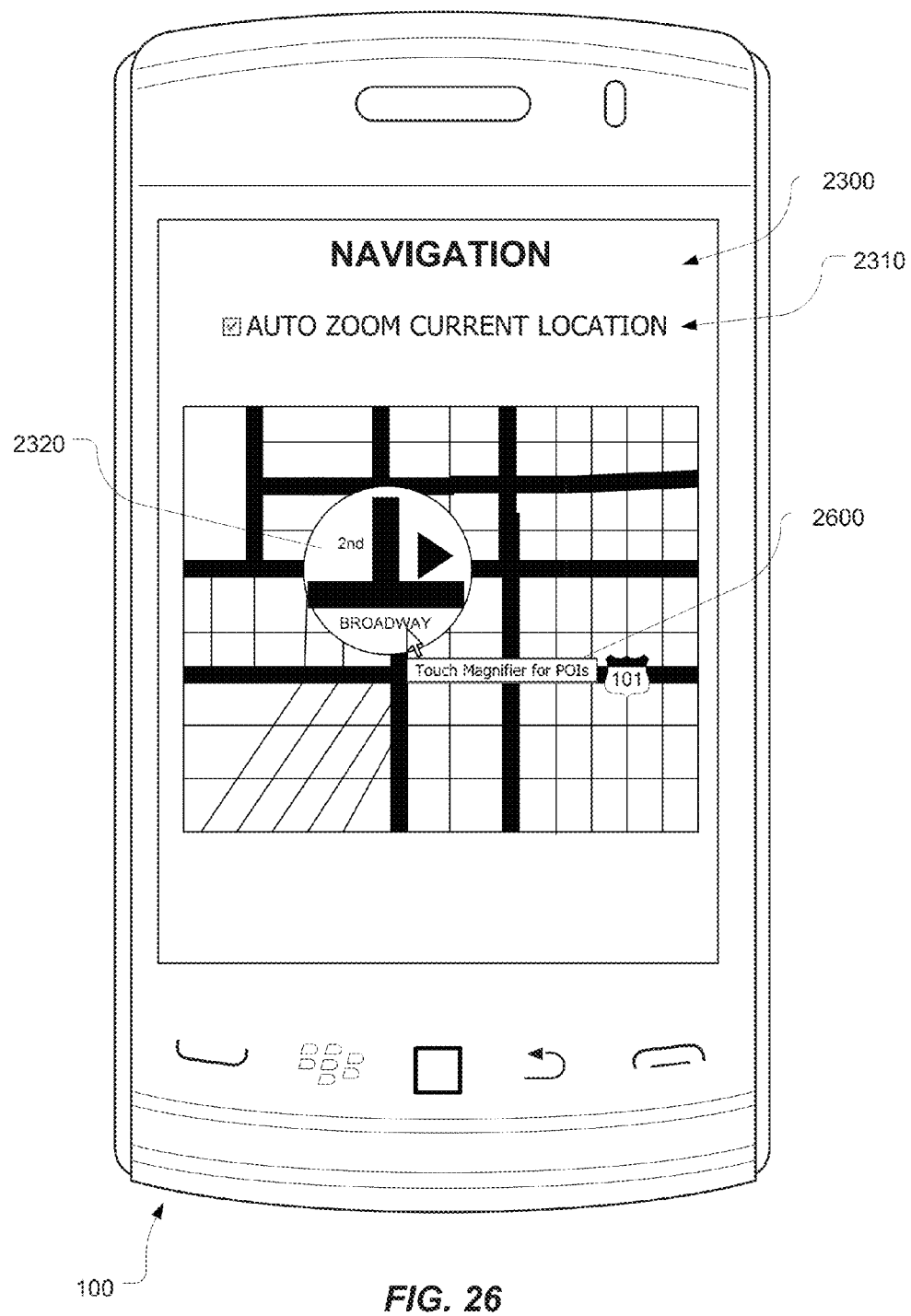
FIG. 26 depicts another variant in which the map magnifier that is automatically locked on the current location can be touched to cause points of interests within the map magnifier to be displayed.

FIG. 26 depicts another variant in which the map magnifier 2320 that is automatically locked on the current location can be touched to cause points of interests within the map magnifier 2320 to be displayed. A text prompt 2600 may be displayed to notify the user that he or she may touch the magnifier 2320 to cause the display of any points of interest or map features within the magnified portion defined by the magnifier.

Figure 27:
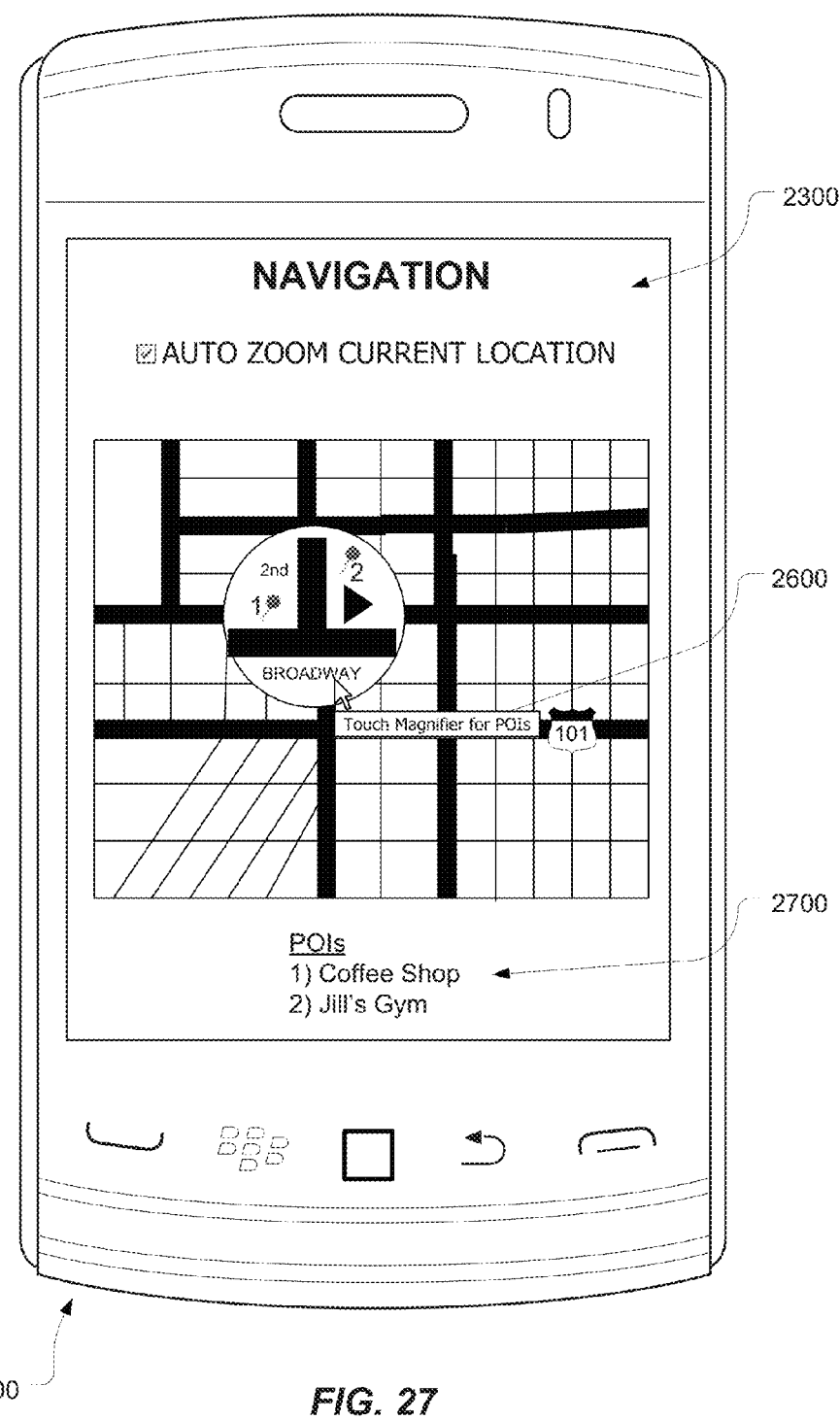
FIG. 27 depicts the displaying of pushpin markers representing points of interest in the map magnifier.

FIG. 27 depicts the displaying of pushpin markers (1,2) representing points of interest (POI's) in the map magnifier. Optionally, point-of-interest information 2700 about the POI 1 and POI 2 may be displayed on the device 100. The information 2700 may include hyperlinks to obtain further information about a selected POI.

Figure 28:
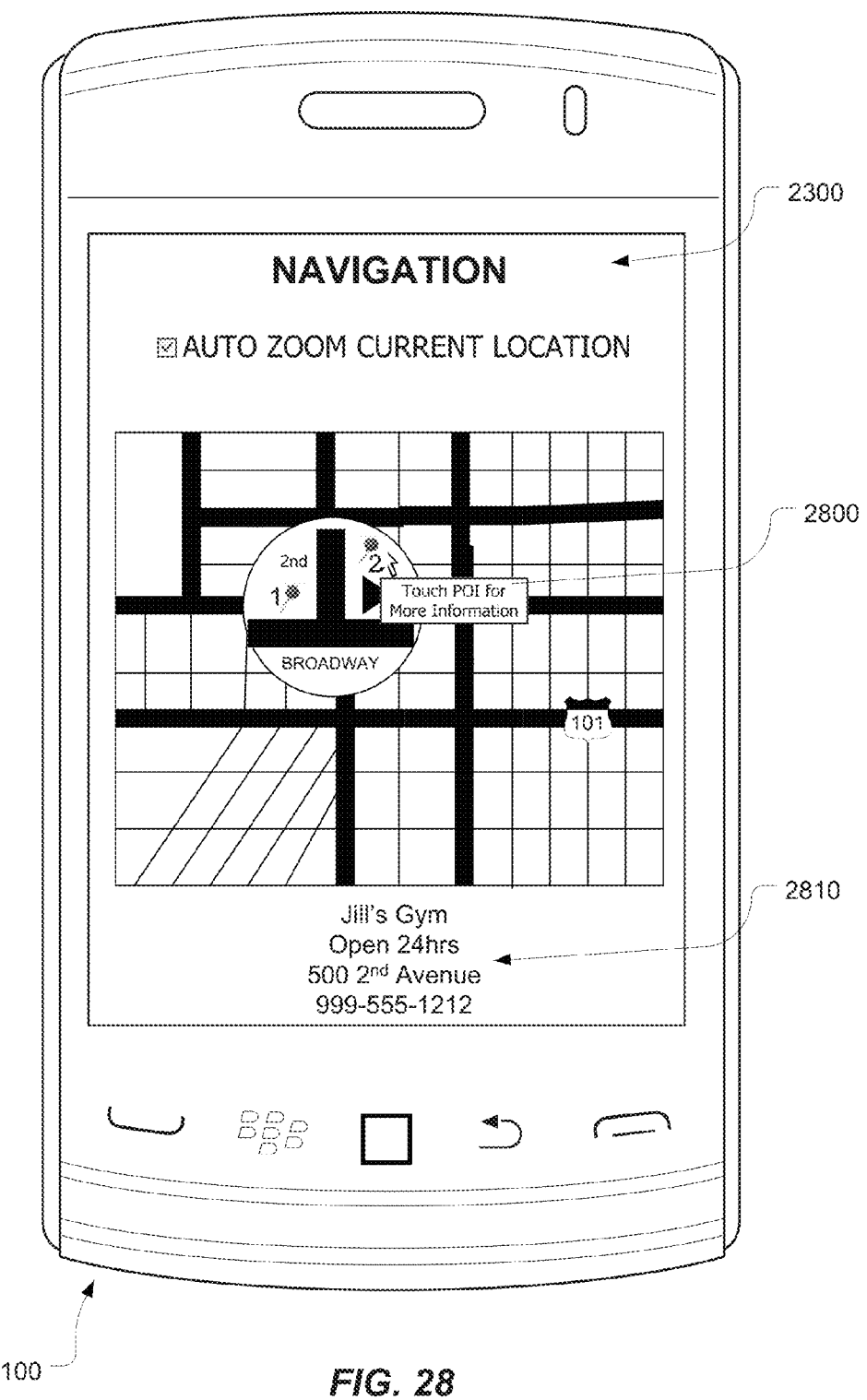
FIG. 28 depicts how each point of interest displayed inside the map magnifier of FIG. 27 is itself an interactive map element which can be touched to obtain further information about that particular point of interest.

FIG. 28 depicts how each point of interest displayed inside the map magnifier of FIG. 27 is itself an interactive map element 2800 which can be touched to obtain further information 2810 about that particular point of interest. Upon receiving user input, the additional information 2810 about the selected POI is presented. Optionally, this information is presented visually in the navigation screen 2300 below the displayed map as shown in the figure. The additional information 2810 may include hyperlinks to initiate a phone call, send a message, or obtain yet further details about the POI.

Figure 29:
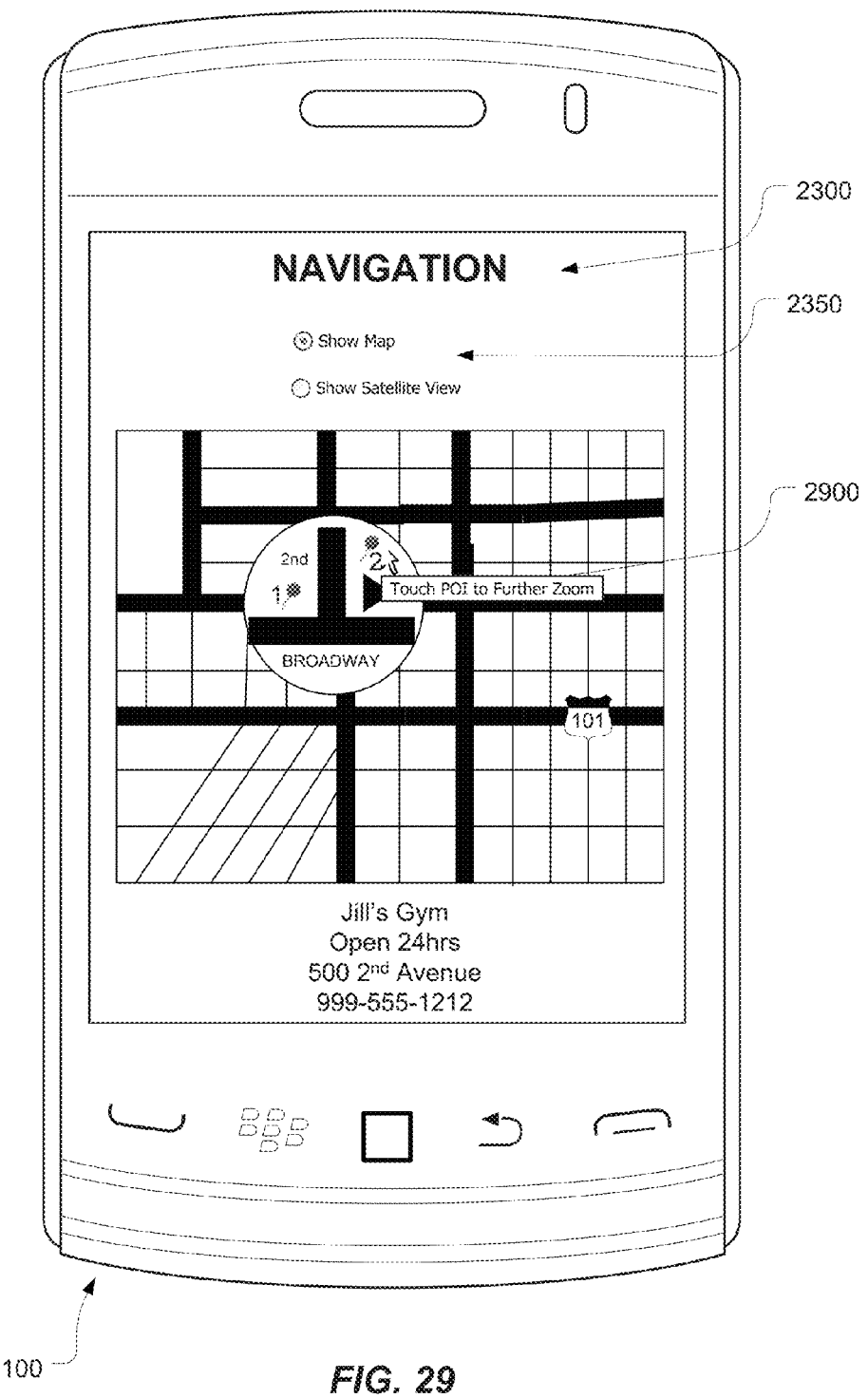
FIG. 29 depicts how each point of interest displayed inside the map magnifier of FIG. 27 may be further zoomed.

FIG. 29 depicts how each point of interest displayed inside the map magnifier of FIG. 27 may be further zoomed. A text prompt, floating text box or balloon 2900 notifies the user that touch input on one of the POI's displayed in the map magnifier will cause the map magnifier to further zoom in on the POI that has been selected (touched). Optionally, the navigation screen 2300 includes user interface elements 2350 to configure the map view, e.g. to switch between a street map view and a satellite view.

Figure 30:
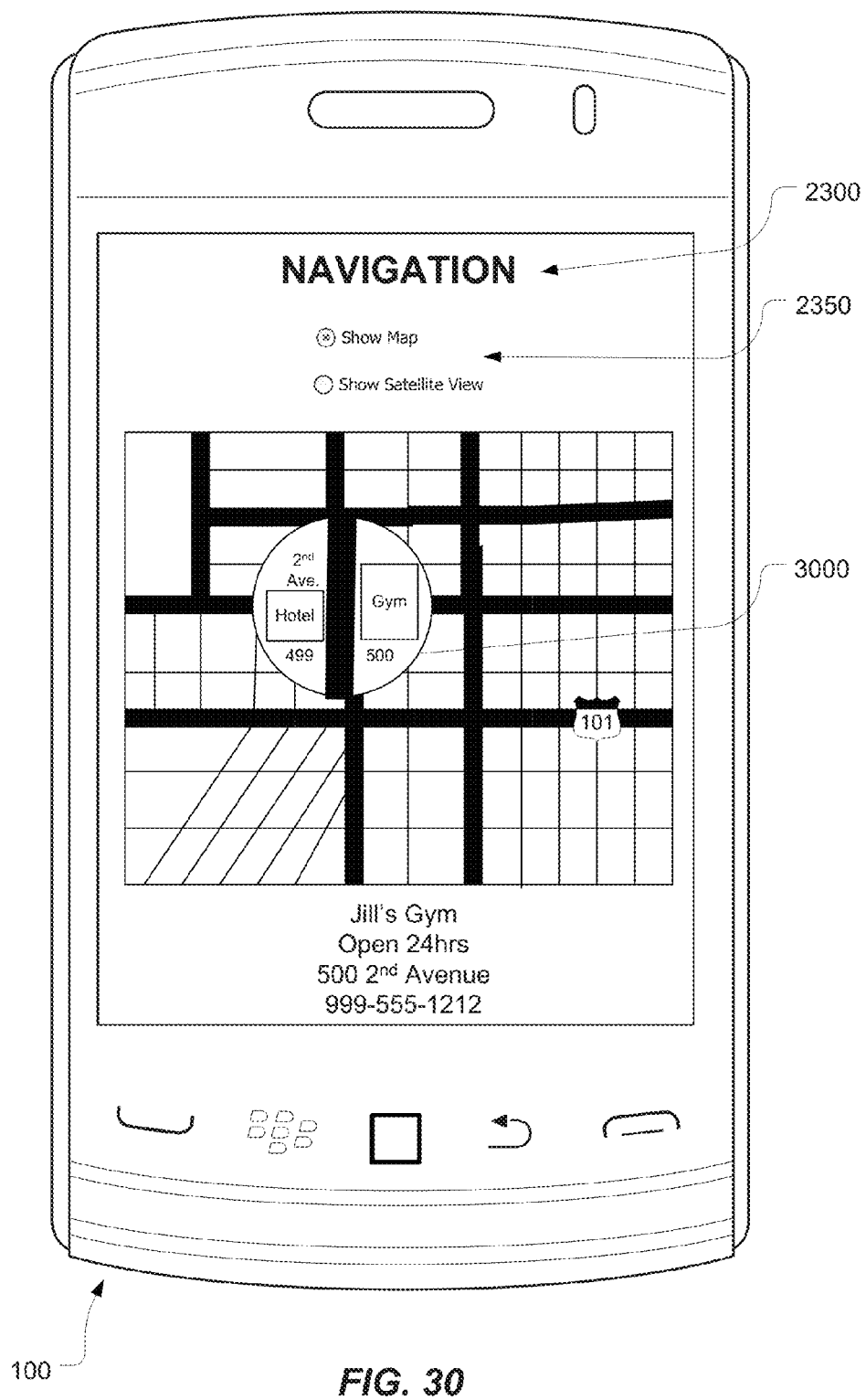
FIG. 30 depicts the point of interest after it has been further zoomed.

FIG. 30 depicts the point of interest (POI 2) after it has been further zoomed. An augmented magnifier 3000 displays the selected POI 2 at an even higher zoom level. In other words, the further zoomed POI 2 is displayed at a third magnification (third zoom level) that is even more detailed than the second zoom level used by the map magnifier in the previous instance. The details of the buildings, civic addresses and street name are shown solely by way of example. Again, the navigation interface 2300 may include toggles, buttons, menus, virtual switches or any other user interface elements to configure or change the type of map being displayed (street map, satellite view, hybrid). In one variant, the device may be configured to display the magnified portion in a first type of map view while displaying the underlying map in a second type of map view (i.e. a view that is different from the first). For example, the magnified portion could be displayed as a street map whereas the underlying map is displayed as a satellite view.

Figure 31:
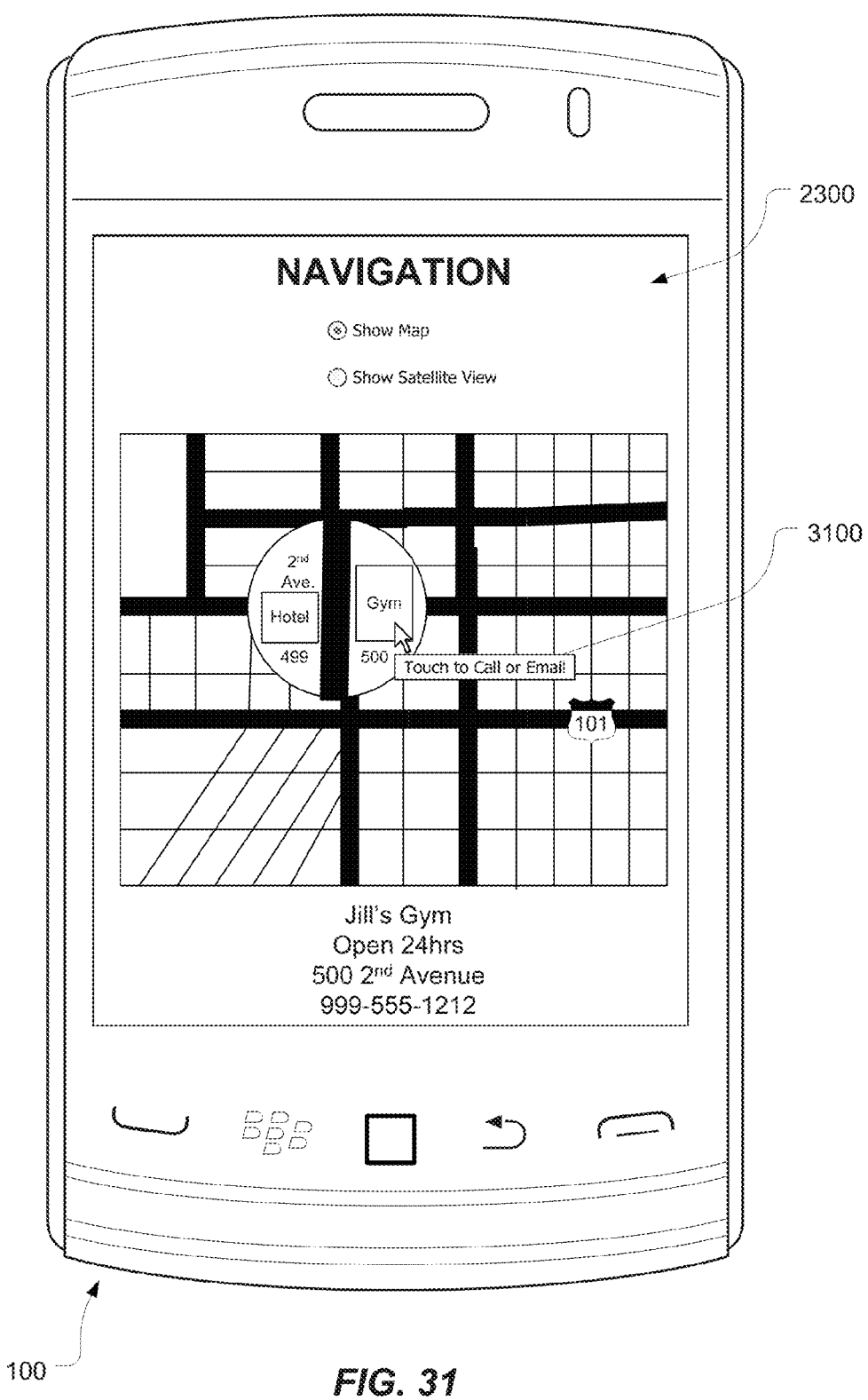
FIG. 31 depicts a mobile device displaying a cursor and dialog box prompting the user to touch the zoomed point of interest to call or email that point of interest.

FIG. 31 depicts a mobile device 100 displaying a cursor and dialog box 3100 (e.g. a text box or balloon) prompting the user to touch the zoomed point of interest to call a number or email an address that is associated with that point of interest.

Figure 32:
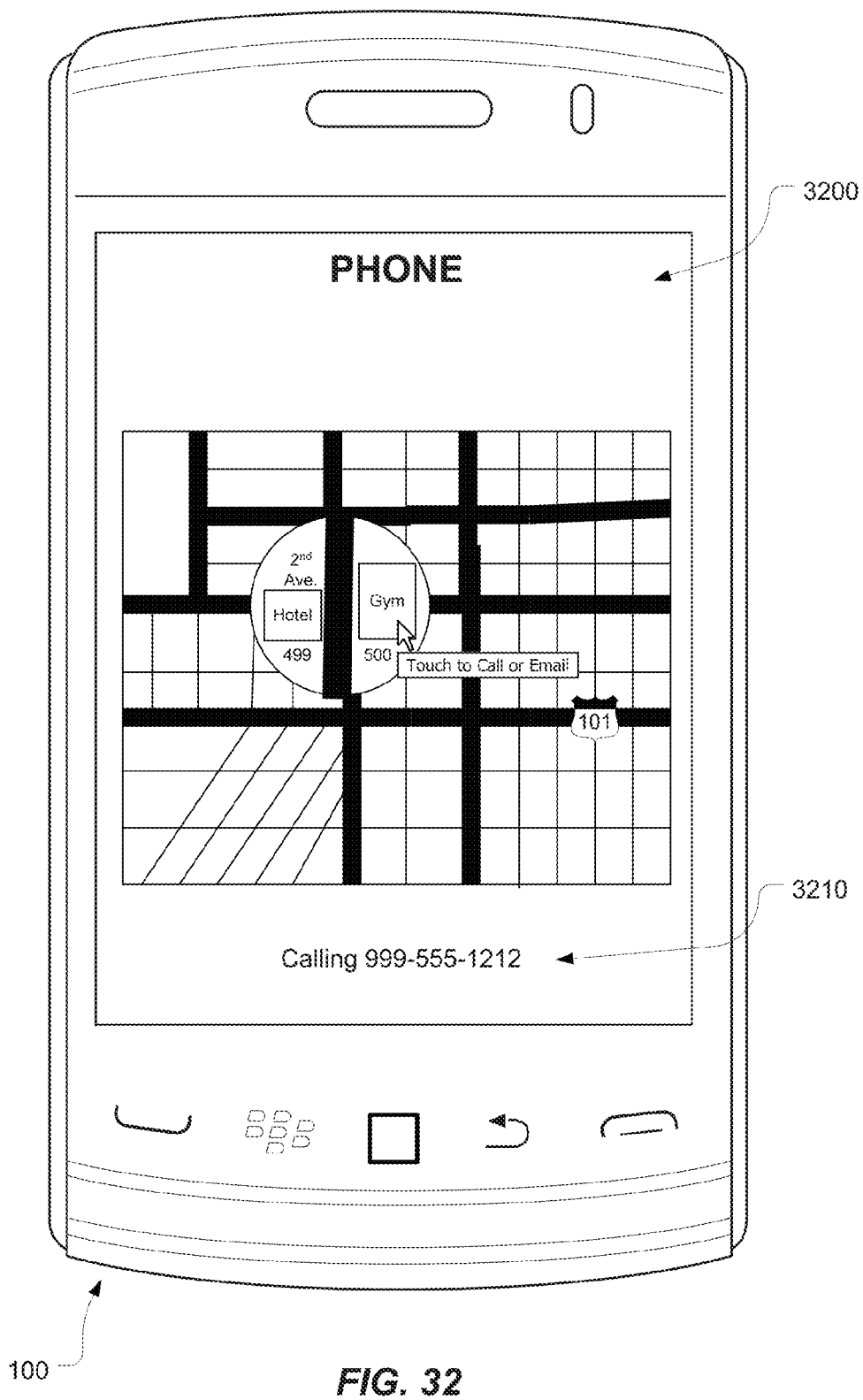
FIG. 32 depicts a phone screen displaying the map and magnified portion and further displaying the number of the POI that is being called.

For example, in one scenario, the user touches the POI to call the number associated with the POI. The device may then optionally switch to a phone screen that contains the map as shown by way of example in FIG. 32. This figure depicts a phone screen 3200 displaying the map and magnified portion and further displaying the number 3210 of the POI that is being called. The name of the called party may optionally also be displayed. In another example scenario, the user touches the POI to send a message (e-mail, SMS, MMS, etc.) to an address associated with the POI.

Figure 33:
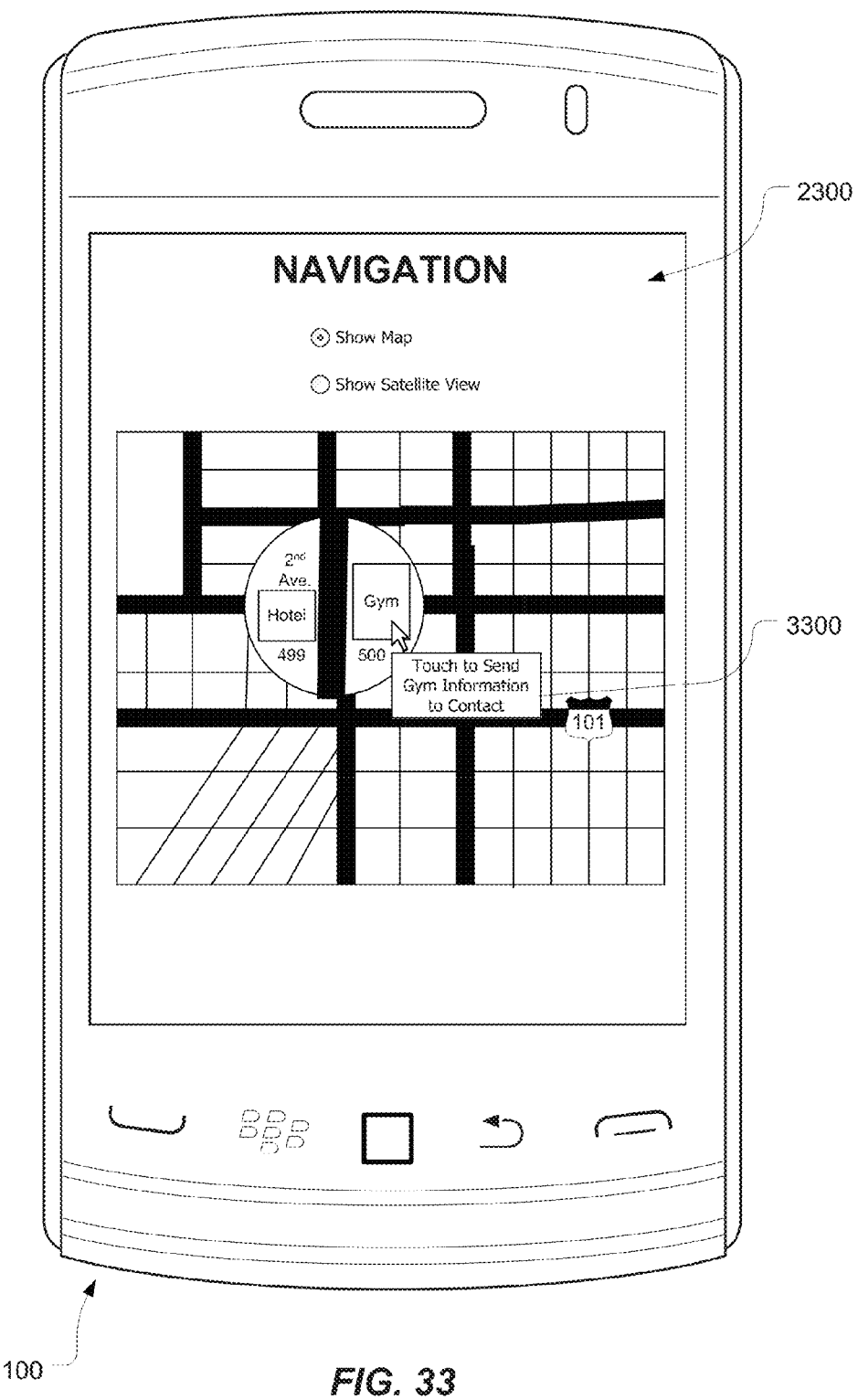
FIG. 33 depicts a mobile device displaying a cursor and dialog box prompting the user to touch the zoomed point of interest to send the map and/or information about the point of interest to a contact.

In a variant, the user may wish to send information about the POI to a third-party recipient. FIG. 33 depicts a mobile device 100 displaying a cursor and dialog box 3300 prompting the user to touch the zoomed point of interest (in this example the gym) to send the map and/or information about the point of interest to a contact. This contact may be selected from an address book on the mobile device or by entering an address in a recipient address field in an e-mail form.

Figure 34:
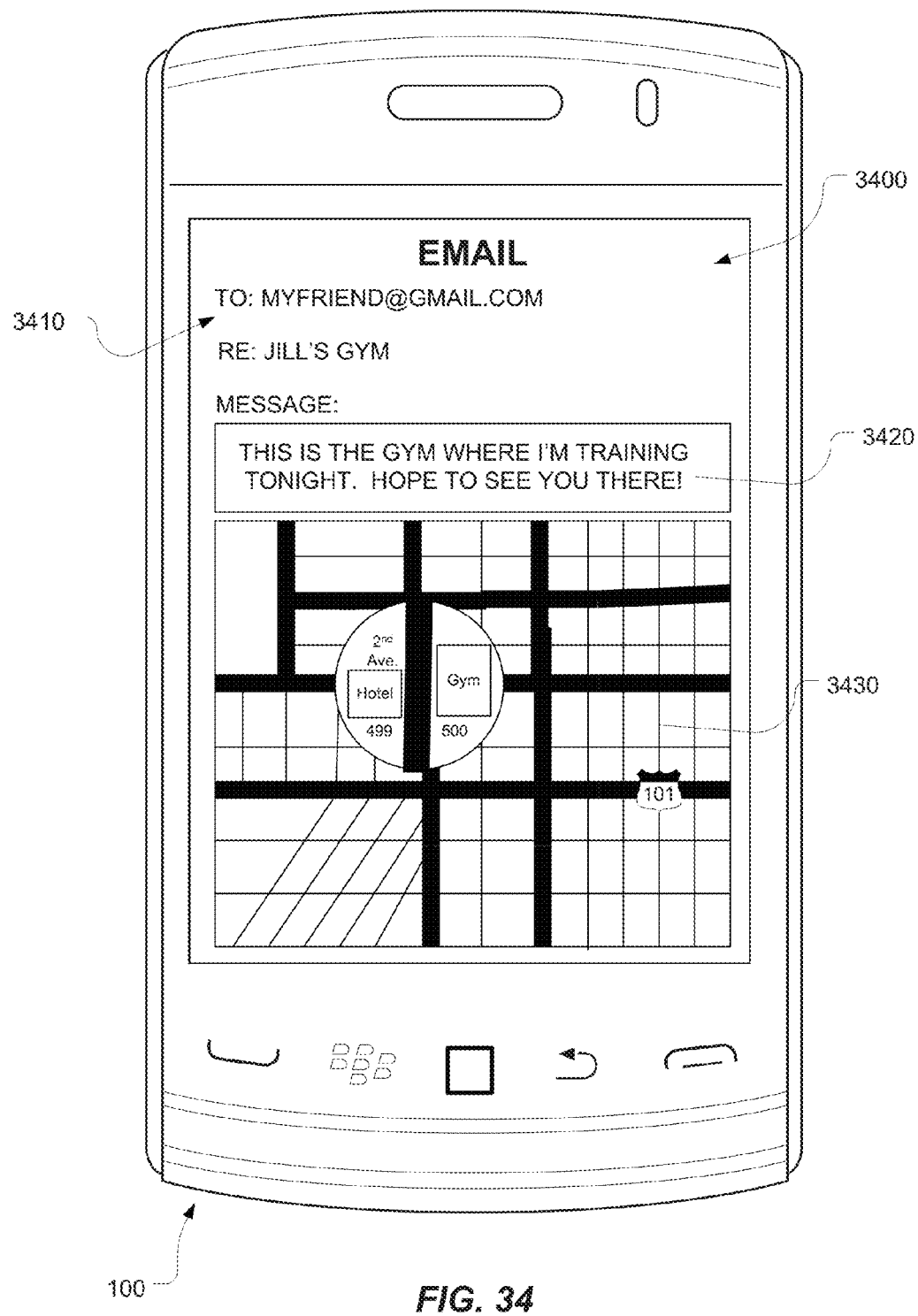
FIG. 34 depicts an e-mail screen displaying recipient and subject fields, a textual message field, and the map with the magnified portion showing details of the point of interest.

FIG. 34 depicts an e-mail screen 3400 displaying an e-mail form having recipient and subject fields 3410 and a textual message field 3420. The map 3430 from the previous interface may be directly embedded into the e-mail with the magnified portion showing details of the point of interest. Upon receipt of the e-mail and embedded map, the recipient may also interact with the interactive map element displayed within the magnified portion.

The mobile device and/or a map application may be configured (for example, using an options, settings or preferences page or in any other suitable manner) to provide one or more of the various features discussed above.

For example, the device and/or map application may be configured to display only a single map magnifier onscreen at one time. Alternatively, the device may be configured to display simultaneously a plurality of map magnifiers. In one specific implementation, the device may be configured to display simultaneously multiple map magnifiers in response to a search query for which there are multiple results to be displayed onscreen. Thus, for example, the user can request that the map application simultaneously display map magnifiers on all map features or points of interests, e.g. all parks, all roads starting with a certain letter, all street addresses having a certain civic number, all coffee shops, all hospitals, all sports complexes, all bus stops, etc.

The manner in which a map magnifier moves from one POI to another may also be configurable. As discussed above, the search results may be filtered by any criterion or set of criteria. Map objects may be displayed that meet the search criteria (e.g. all parks, all streets starting with a certain letter, all restaurants, pubs, hotels, train stations, etc.). As noted above, this enables the user to navigate from one map object to another by causing the map magnifier to jump from one search result to the next. The navigation or movement of the magnifier from one POI to the next may be configured in various ways: to jump to the geographically closest POI, to move the next POI in the list of search results, to move to the next POI selected onscreen by the user, etc.

The appearance, size and shape of the map magnifier may be configurable.

In one implementation, the mobile device may receive input on a user interface to specify one or more of a size and shape of the magnified portion. In response to this input, the processor causes the device to adjust one or more of the size and shape of the magnified portion.

For example, the device may optionally be configured to automatically adjust the size of the map magnifier. For example, the device may be configured to automatically adjust its size to display only a single point of interest at one time or to display multiple points of interest at one time where the points of interest are tightly clustered. For example, the size may be configured relatively to the size f the map being displayed, e.g. a diameter of the map magnifier may be expressed as a percentage or fraction of the map width or other map dimension.

The device may optionally also enable the user to configure the shape and/or appearance of the map magnifier. This would permit the user to customize or adapt the appearance and/or shape of the map magnifier. In a variant, edge effects of the map magnifier may be user-configured. The map magnifier may be configured to resemble a virtual monocle or a virtual magnifying glass with a handle or to have any other desired appearance or shape. Shading, colouring, hatching or other such effects may also be specified.

In certain implementations of this technology, the map magnifier can be attached to (and thus movable with) an onscreen object (POI, route, location, etc.) that it is magnifying or with which it is associated. For example, if the map is panned, the map magnifier moves with the associated object which with it is associated. If the object is panned slightly off screen, the map magnifier will follow its associated object. A truncated map magnifier may thus be made to appear on the edge of the screen. The truncated map magnifier still magnifies the onscreen area that is beside the offscreen object. The shape and location of the magnifier would thus indicate to the user the direction of the offscreen object beyond the edge of the screen.

As noted above, this map magnifier technology can be used on any computing device. The illustrated implementations involving a mobile device are presented solely by way of example because of the particular usefulness of the technology for devices that have a small screen and which experience zoom lag due to a wireless connection to a map server. The technology, however, may be applied to any map application running on a desktop computer, laptop computer, workstation or any other wired or wireless computing device.

This new technology has been described in terms of specific implementations and configurations which are intended to be exemplary only. Persons of ordinary skill in the art will appreciated, having read this disclosure, that many obvious variations, modifications and refinements may be made without departing from the inventive concepts presented herein. The scope of the exclusive right sought by the Applicant(s) is therefore intended to be limited solely by the appended claims.

The invention claimed is:

1. A method of magnifying a portion of a map displayed on a computing device, the method comprising:
   receiving a plurality of search results;
   displaying the map at a first zoom level;
   displaying map markers on the map at map locations associated with each one of the plurality of search results including a first map marker at a first map location;
   displaying as an overlay on the map a magnified portion of the map at a second zoom level for viewing the first map location in greater detail, wherein the magnified portion and the map at the first zoom level are displayed simultaneously;
   displaying a notification inviting user input at the first map marker displayed in the magnified portion to display the magnified portion at a third zoom level, wherein the third zoom level allows for viewing of the first map location in greater detail than the second zoom level;
   receiving input at the first map marker; and displaying in response to the input at the first map marker, the magnified portion at the third zoom level for viewing the first map location associated with the first map marker at the third zoom level.

2. The method as claimed in claim 1 further comprising:
in response to receiving input via an interactive map element displayed in the magnified portion of the map, displaying on the map additional information about the first map location.

3. The method as claimed in claim 1 further comprising:
receiving input on a user interface to specify one or more of a size and shape of the magnified portion; and
adjusting one or more of the size and shape of the magnified portion in response to the input.

4. The method as claimed in claim 1 wherein displaying the magnified portion of the map at the second zoom level comprises displaying a substantially circular map magnifier having a circular outer frame such that the map magnifier resembles a virtual magnifying glass.

5. The method as claimed in claim 1 wherein displaying the magnified portion of the map comprises simultaneously displaying a plurality of magnified portions of the map.

6. The method as claimed in claim 1 wherein:
the map markers displayed on the map at the first zoom level include a second map marker at a second map location,
the method further comprising:
displaying a user interface element with the map at a different display location than the map marker for the second map location;
moving the magnified portion on the map in response to receiving user input via the user interface element, the moving involving the computing device automatically causing the magnified portion to jump from the first map location to the second map location.

7. The method as claimed in claim 1 further comprising:
displaying a further notification inviting user input at the first map marker displayed in the magnified portion to automatically call a phone number associated with the search result associated with the first map marker;
receiving input at the first map marker; and
automatically calling by the computing device, in response to the input at the first map marker, the phone number.

8. The method as claimed in claim 1 wherein the map displayed at the first zoom level is a first map type while the map displayed in the magnified portion is a second map type different from the first map type, wherein the first and second map types are one of: a street map type, a satellite map type, or a hybrid street-satellite map type.

9. A non-transitory computer-readable medium comprising instructions in code which when loaded into a memory and executed by a processor of a computing device causes the computing device to:
receive a plurality of search results;
display the map at a first zoom level;
display map markers on the map at map locations associated with each one of the plurality of search results including a first map marker at a first map location;
display as an overlay on the map a magnified portion of the map at a second zoom level for viewing the first map location in greater detail, wherein the magnified portion and the map at the first zoom level are displayed simultaneously;
display a notification inviting user input at the first map marker displayed in the magnified portion to display the magnified portion at a third zoom level, wherein the third zoom level allows for viewing of the first map location in greater detail than the second zoom level;
receive input at the first map marker; and
display, in response to the input at the first map marker, the magnified portion at the third zoom level for viewing the first map location associated with the first map marker at the third zoom level.

10. The computer-readable medium as claimed in claim 9 wherein the code is further configured to:
in response to receiving input via an interactive map element in the magnified portion of the map, display on the map additional information about one of the first map location.

11. The computer-readable medium as claimed in claim 9 wherein the code is further configured to:
receive input on a user interface to specify one or more of a size and shape of the magnified portion; and
adjust one or more of the size and shape of the magnified portion in response to the input.

12. The computer-readable medium as claimed in claim 9 wherein displaying the magnified portion of the map at the second zoom level comprises displaying a substantially circular map magnifier having a circular outer frame such that the map magnifier resembles a virtual magnifying glass.

13. The computer-readable medium as claimed in claim 9 wherein displaying the magnified portion of the map comprises simultaneously displaying a plurality of magnified portions of the map.

14. The computer-readable medium as claimed in claim 9 wherein:
the map markers displayed on the map at the first zoom level include a second map marker at a second map location, and wherein the code causes the computing device to further:
display a user interface element with the map at a different display location than the map marker for the second map location;
move the magnified portion on the map in response to receiving user input via the user interface element, the moving involving the computing device automatically causing the magnified portion to jump from the first map location to the second map location.

15. A computing device for displaying a map and for simultaneously displaying a magnified portion of the map, the computing device comprising:
a user input device for receiving a search term;
a communication subsystem for communicating the search term to a web-based search engine and for receiving search results;
a processor operatively connected to a memory tier executing a map application to display the map at a first zoom level, and for displaying map markers on the map at map locations associated with each one of the plurality of search results including a first map marker at a first location; and
a display for simultaneously displaying on the map the magnified portion of the map at a second zoom level as an overlay on the map for viewing the first map location in greater detail, for further displaying a notification inviting user input at the first map marker displayed in the magnified portion to display the magnified portion at a third zoom level, wherein the third zoom level allows for viewing of the first map location in greater detail than the second zoom level, and for displaying, in response to input received at the first map marker, the magnified portion at the third zoom level for viewing the first map location associated with the first map marker at the third zoom level.

16. The computing device as claimed in claim 15 wherein the processor is configured to cause the display to simultaneously display a plurality of magnified portions and to highlight one of the plurality of magnified portions of the map to signify that the interactive map element in the magnified portion of the map that is currently highlighted may currently receive user input.

17. The computing device as claimed in claim 16 wherein the processor is configured to automatically resize the magnified portions of the map based on a number of magnified portions to be displayed on the map.

18. The computing device as claimed in claim 15 further configured to:

receive input via the user input device to specify one or more of a size and shape of the magnified portion; and adjust one or more of the size and shape of the magnified portion in response to the input.

19. The computing device as claimed in claim 15 wherein the processor is configured to cause the display to simultaneously display a plurality of magnified portions of the map.

20. The computing device as claimed in claim 15 wherein:

the map markers displayed on the map at the first zoom level include a second map marker at a second map location, and the display is for further displaying a user interface element at a different display location than the map marker for the second map location, wherein the magnified portion comprises an interactive map element, and wherein the processor causes the magnified portion to move on the map in response to receiving user input via the user interface element, the moving involving the processor automatically causing the magnified portion to jump from the first map location to the second map location.

* * * * *

UNITED STATES PATENT AND TRADEMARK OFFICE
CERTIFICATE OF CORRECTION

PATENT NO. : 9,207,096 B2
APPLICATION NO. : 13/156926
DATED : December 8, 2015
INVENTOR(S) : Sartipi et al.

Page 1 of 1

It is certified that error appears in the above-identified patent and that said Letters Patent is hereby corrected as shown below:

IN THE CLAIMS

Column 14, Line 52, Claim 15 delete "tier executing a map" insert --for executing a map--

Signed and Sealed this
Twenty-ninth Day of March, 2016

Michelle K. Lee
*Director of the United States Patent and Trademark Office*